United States Patent [19]
Emery

[11] Patent Number: 6,163,657
[45] Date of Patent: Dec. 19, 2000

[54] PHOTOGRAPHIC ORIENTATION DEVICE AND METHOD OF PHOTOGRAPHY

[75] Inventor: Benjamin H. Emery, Pittsburgh, Pa.

[73] Assignee: Emery Properties, Inc., Wilmington, Del.

[21] Appl. No.: 09/251,574

[22] Filed: Feb. 17, 1999

[51] Int. Cl.$^7$ .................................................. G03B 17/48
[52] U.S. Cl. ........................................................ 396/431
[58] Field of Search .............................. 396/431; 348/207

[56] References Cited

U.S. PATENT DOCUMENTS

| | | | |
|---|---|---|---|
| 2,906,164 | 9/1959 | Dresser | 396/431 |
| 4,676,619 | 6/1987 | Woolley | 396/429 |
| 4,938,697 | 7/1990 | Mayer | 434/289 |
| 5,650,817 | 7/1997 | Jae-chon | 348/207 |
| 5,694,632 | 12/1997 | Capper | 396/431 |
| 5,752,115 | 5/1998 | McIntyre et al. | 396/431 |
| 5,870,642 | 2/1999 | Mittelstaedt et al. | 396/428 |

*Primary Examiner*—David M. Gray
*Attorney, Agent, or Firm*—Kirkpatrick & Lockhart LLP

[57] ABSTRACT

Apparatus for orienting a lens of a camera in at least one predetermined direction relative to a reference point. The apparatus may comprise an openable housing for supporting a disposable camera therein. The housing is equipped with a beam projecting device that projects a beam onto a corresponding reference point which enables the housing and camera to be precisely indexed around the reference point for taking related photographs therearound. The apparatus may comprise a beam projecting device that is supported in a socket integrally mounted in a camera housing or the beam projecting device may be attached to a mounting plate that can be attached to the camera housing. Other sighting devices may be employed with the camera for use with correspondingly shaped reference points to facilitate indexing of the camera therearound.

70 Claims, 24 Drawing Sheets

PHOTOGRAPHIC ORIENTATION DEVICE AND METHOD OF PHOTOGRAPHY

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to indexing apparatuses and methods for indexing an object about a reference point and/or an axis and, more particularly, to apparatuses for orienting a camera in desired orientations and methods for taking photographs, videos, etc.

2. Description of the Invention Background

Historians report that the first box camera that projected images onto a wall was invented some time during the 16$^{th}$ century. However, film did not exist at that time. About three hundred years later, Frenchmen Joseph-Nicephore Niepce and Louis Daguerre took photographs using metal plates. In 1888, George Eastman reportedly invented the "box" camera and film. Today, Mr. Eastman would probably be amazed at the different types of cameras and films that have been developed over the years.

With advent of today's many sophisticated cameras, came the need for reliable apparatuses for supporting those cameras in predetermined positions. For example, one type of photography that has been rapidly advancing is known as "immersive" photography. Such method of photography uses photographic images and computer software to enable a viewer, through the use of a computer terminal, to interact with the photographic images.

One type of immersive photography permits the viewer to selectively view images which are interrelated by the appropriate software to form a panoramic view of an object, a room, an outdoor scene, etc. By photographing the object, room, scene, etc. at precise intervals, the software enables the viewer to interact with the scene by looking to the left, right, up and down. In some applications zooming is also possible to reveal more detail in the scene. A typical panoramic movie presents a full 360° view that the user can pan, tilt, and zoom about. This capability is referred to as a "full panorama". "Partial panoramas" are also available which present less than a 360° view of a scene.

Such software requires the ability to take a series of photographs of the object, scene, building, etc. that can be relatively precisely interrelated to each other. For example, one type of immersive photography requires a series of twelve photographs to be taken at precise intervals about an axis to create a full 360° image. Another software program requires two photographs to be taken about a common axis or reference point. In many applications the use of a standard tripod for supporting the camera while it is being indexed is prohibited due to a lack of space or the risk of damage to surrounding objects during the positioning of the tripod.

Thus, there is a need for apparatus that enables one to accurately index a camera about a reference point and/or axis such that a plurality of photographs may be taken about such axis and/or reference point at different positions relative to each other without the use of a tripod.

There is a further need for an apparatus having the above-mentioned attributes that is relatively inexpensive to manufacture and that can be used in connection with existing disposable cameras.

There is yet another need for apparatus that has the above-mentioned attributes that can be used to accurately index a variety of different photographic devices, such as SLR cameras, video cameras, digital cameras, etc.

Another need exists for an indexing device that can be affixed to a camera by means of a screw hole in the camera normally used to attach a tripod or other accessories to the camera.

Yet another need exists for method for indexing an object accurately about an axis of reference point without the need for rigid supporting apparatus for supporting the object thereon.

A further need exists for a method of taking photographs for immersive photography applications that does not require the use of expensive tripods and similar apparatus.

SUMMARY OF THE INVENTION

In accordance with a particularly preferred form of the present invention, there is provided an apparatus for orienting a lens of a camera in at least one predetermined direction relative to a reference point. The apparatus includes a beam projector and a mounting device that attaches the beam projector to the camera in a predetermined orientation such that when the beam projector projects a viewable beam onto the reference point, the camera lens faces a predetermined direction.

Another embodiment of the present invention comprises an apparatus for orienting the lens of a disposable camera in at least one predetermined direction relative to a reference point. The apparatus comprises a housing sized to receive at least a portion of the disposable camera therein such that the lens is unobstructed by the housing. The housing is also constructed to permit access to the camera actuator. The apparatus further includes a beam projector that is attached to the housing such that when the beam projector projects at least one beam onto the reference point, the camera lens is oriented in at least one predetermined direction.

Another embodiment of the subject invention comprises a camera that includes a camera housing, a shutter and lens assembly, a film handling assembly, a beam projector and a socket integrally formed with the camera housing and sized to receive at least a portion of a beam projector therein. A slot is provided in the socket for receiving an orientation portion of the beam projector therein to orient the beam projector within the socket in a predetermined orientation such that when the beam projector projects a beam onto a reference point, the camera lens is oriented in a predetermined direction.

Another embodiment of the subject invention comprises apparatus for orienting a lens of a camera relative to a reference point in a predetermined direction. This apparatus includes a sighting device that has orienting indicia thereon such that when the orienting indicia is oriented relative to the reference point in a predetermined orientation, the camera lens is oriented in a predetermined direction.

The subject invention also comprises a method for selectively orienting a lens of a camera in at least one predetermined direction. The method comprises providing a beam generator on the camera for generating a beam having a predetermined shape. The method also includes establishing a reference point such that when the beam generated by the beam generator is aligned with the reference point in a predetermined orientation, the camera lens is oriented in a predetermined direction. The method further comprises aligning the beam in the predetermined orientation relative to the reference point.

Another embodiment of the subject invention comprises a method for sequentially orienting a lens of a camera in a plurality of predetermined directions. The method includes providing a beam generator on the camera for generating a beam having a predetermined shape. The method further comprises establishing a reference point that defines a plurality of reference orientations wherein each reference orientation corresponds with a predetermined direction such that when the beam generated by the beam generator is aligned with the reference point in a reference orientation, the camera lens is oriented in the predetermined direction that corresponds to the reference orientation. The method further includes aligning the beam with the reference point in one of the reference orientations such that the camera lens faces a direction corresponding to that reference orientation and thereafter realigning the beam with the reference point in another reference orientation such that the camera lens faces another direction corresponding to the another reference orientation.

Another embodiment of the subject invention comprises apparatus for orienting a portion of an object in at least one predetermined direction relative to a reference point. The apparatus includes a beam projector and a mounting device that attaches the beam projector to the object in a predetermined orientation such that when the beam projector projects a viewable beam onto the reference point, the portion of the object faces a predetermined direction.

Yet another embodiment of the subject invention comprises a method for sequentially orienting an object in a plurality of predetermined directions. The method includes providing a beam generator on the object for generating a beam that has a predetermined shape. The method further includes establishing a reference point that defines a plurality of reference orientations wherein each reference orientation corresponds to a predetermined direction such that when the beam generated by the beam generator is aligned with the reference point in a reference orientation, the object is oriented in the predetermined direction that corresponds to the reference orientation. The method further includes aligning the beam with the reference point in one of the reference orientations such that a portion of the object faces a direction corresponding to that reference orientation and, thereafter, realigning the beam with the reference point in another reference orientation such that the portion of the object faces another direction corresponding to the another reference orientation.

It is a feature of the present invention to provide apparatus for relatively precisely indexing a camera about a reference point or axis without the need for a tripod or other camera supporting device.

It is another feature of the present invention to provide a device having the above-mentioned attributes that can be used in connection with disposable cameras.

Yet another feature of the subject invention is to provide a camera indexing device that can be integrally molded with the camera housing.

Still another feature of the subject invention is to provide a camera indexing apparatus that can be removably attachable to a variety of different cameras and photographic devices.

Yet another feature of the subject invention is to provide a method for taking a series of photographs about an axis or reference point that can be used for immersive photography applications.

Another feature of the subject invention is to provide a method for indexing a camera about a reference point or axis that can be accomplished without disturbing the surrounding environment.

Another feature of the subject invention is to provide methods and apparatuses for precisely indexing an object about an axis or reference point.

Accordingly, the present invention provides solutions to various problems associated with acquiring photographs for immersive photography applications. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein.

DETAILED DESCRIPTION OF THE PREFERRED EMBODIMENTS

Figure 1:
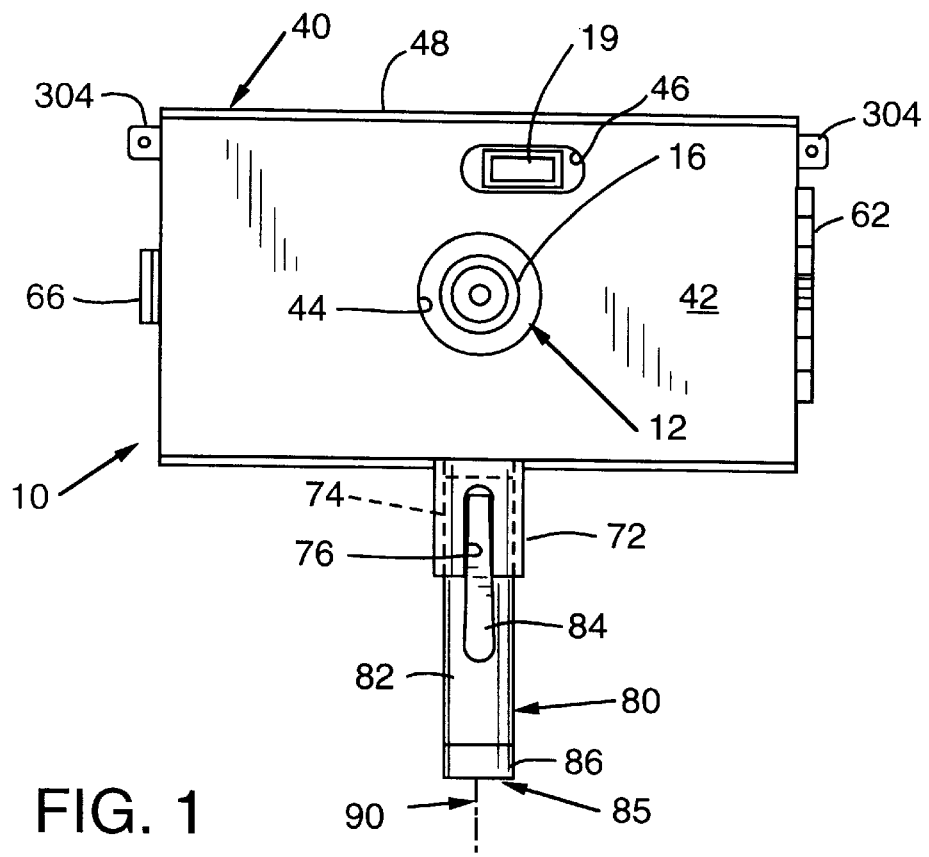
FIG. 1 is a front view of a housing of the present invention used in connection with a disposable camera.

Referring now to the drawings for the purposes of illustrating the present preferred embodiments of the invention only and not for the purposes of limiting the same, FIGS. 1–9, illustrate a housing assembly 10 of the present invention that is particularly well-adapted for use in connection with a variety of different commercially available disposable cameras 12. Such disposable cameras are well known in the art and, therefore, their construction and operation will not be discussed in detail herein. Such disposable cameras 12 usually comprise a camera housing 14 fabricated from cardboard that houses a lens and shutter assembly 16, a film and film advance mechanism 18, a flash assembly 19 and an actuation button 20. Those of ordinary skill in the art will appreciate that in order to take multiple photographs, the user must manually advance the film after each photograph is taken.

To access the film for developing purposes, the camera housing 12 must be breached which renders the camera unsuitable for further use. However, the photographs provided by such cameras are typically of sufficient quality to operate well with existing immersive photography software programs for manipulating a series of sequentially taken and/or related photographs. For example, the camera 12 may be used to take a series of photographs of a room from, for example, four different positions about a common reference point established within the room. Those photographs must then be downloaded into the computer, via a scanner, utilizing known techniques so that they can be manipulated by the software. For example, interrelated photographs taken by a disposable camera manufactured by Fuji Photo Film Co. LTD, of Tokyo, Japan in connection with the present invention may be used in connection with software manufactured by VR Toolbox, Inc. of Pittsburgh, Pa. under the trademark VR PANOWORX to enable the user to selectively manipulate such photographs, via a computer key board. As the present Detailed Description proceeds, however, it will be appreciated by those of ordinary skill in the art that the various embodiments of the present invention may be used in connection with a myriad of other photographic devises, such as SLR cameras, digital cameras, video cameras, etc. manufactured by various manufacturers. Furthermore, the present invention could be used in connection with other types of software programs and, therefore, the protections afforded to the subject invention hereby should not be limited to use of the subject invention in connection with the aforementioned software. In addition, the subject invention may be successfully employed in other applications wherein it is advantageous to index an object about an axis or reference point in relatively precise intervals. Thus, the subject invention should not be limited to use solely in connection with photographic devices.

Figure 11:
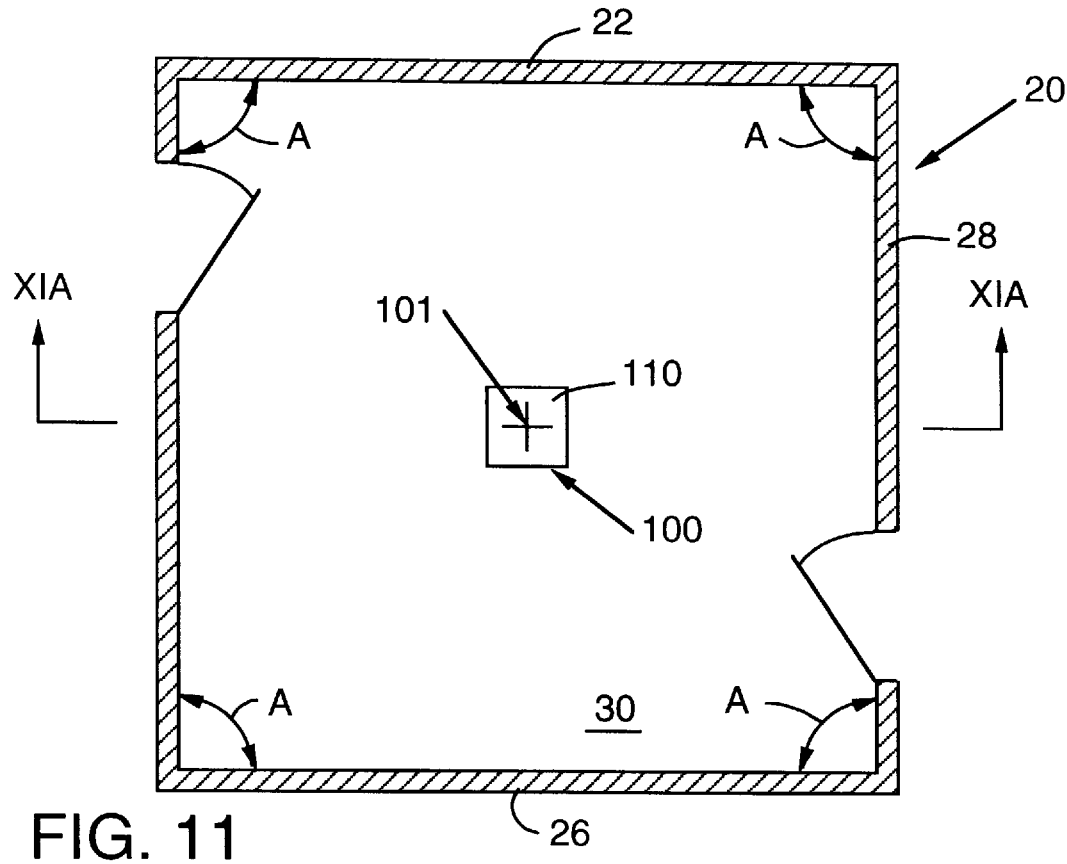
FIG. 11 is a top view of a room wherein the present invention may be used to photograph the walls thereof about a common reference point and axis taken along line XI—XI in FIG. 11A.
Figure 11A:
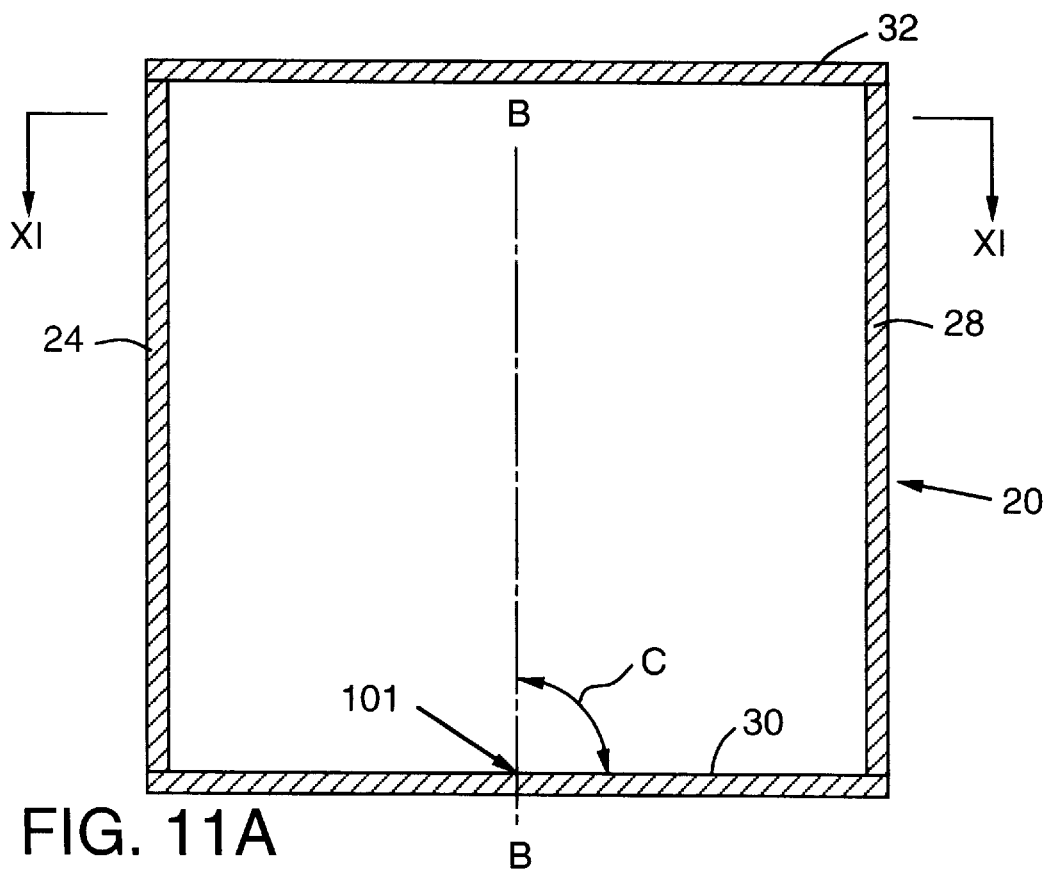
FIG. 11A is an elevation view of the room of FIG. 11 taken along line XIA—XIA in FIG. 11.

FIG. 11 is a plan view of a room 20 that has four walls (22, 24, 26, 28), a floor 30 and a ceiling 32. The present invention may be successfully used in connection with a disposable camera 12 to take, for example, a series of four photographs (one photograph of each wall, 22, 24, 26, 28) that can be used in connection with the software of the types described above. For the purposes of this example only, the walls (22, 24, 26, 28) are oriented substantially 90° relative to each other (angles "A" in FIG. 1) such that four photographs taken at 90° intervals relative to each other about a common reference point 100 or reference axis B-B that extends perpendicularly through reference point 100 (i.e., angle C is 90°) could enable a user, with the aid of the aforementioned software, to establish a "full panorama view" of the room 20. The reader will appreciate that this example is merely illustrative of the way in which the subject invention could be successfully employed. The present invention could also be used to index the camera 12 about a reference point or reference axis for a number of different intervals to obtain full panorama view or less than full panorama views of a variety of objects, room, etc., depending upon the shape of the room, object, etc. being photographed and the type of software employed. For example, one type of immersive photography requires a series of twelve photographs to be taken at precise intervals about an axis or reference point to create a full 360° image. Another software requires two "fisheye" photographs to be taken about a common axis or reference point in "back-to-back" fashion, in order to create a full 360° image.

Figure 8:
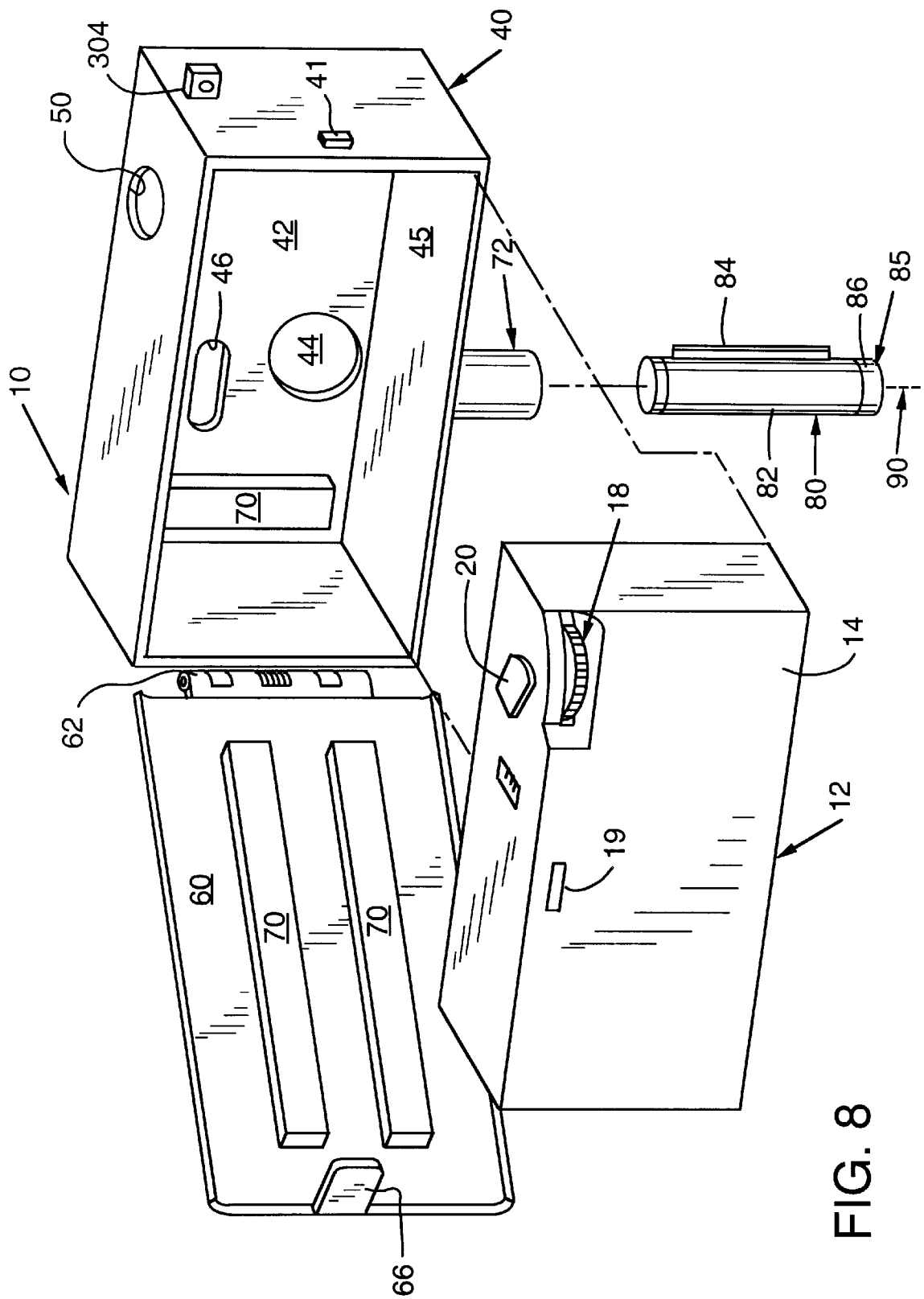
FIG. 8 is an exploded assembly view of the camera and housing of FIGS. 1–7.
Figure 9:
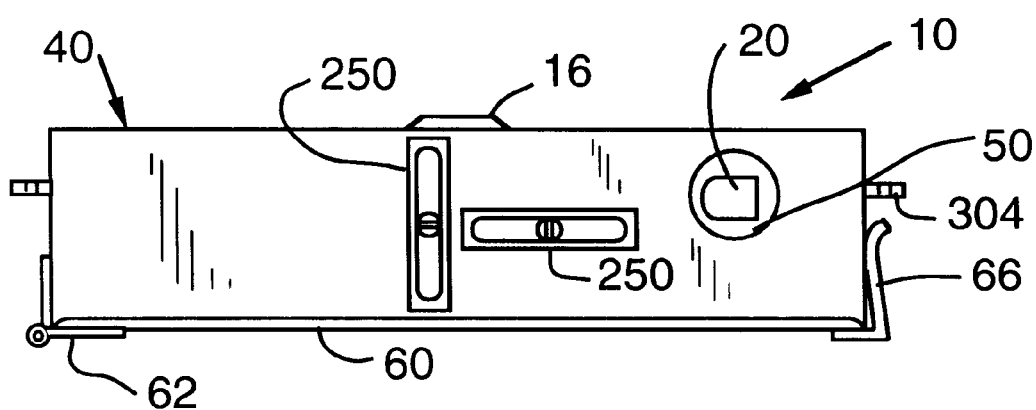
FIG. 9 is a top view of a housing of the present invention with two bubble levels attached thereto.

The embodiment of the subject invention depicted in FIGS. 1–9, includes a housing member 40 that is sized to receive a camera 12 therein. Housing member 40 may be fabricated from a variety of different materials, such as steel, aluminum, polymeric materials, etc. As can be seen in FIGS. 1–8, the forward portion 42 of the housing 40 has a lens opening 44 that corresponds to the lens and shutter assembly 16 of the camera 12 and an opening 46 that corresponds to the flash assembly 19 of the camera 12. The top surface 48 of the housing 40 also as an opening 50 to permit access to the actuator button 20 of the camera 12. In addition, the housing 40 as shown in FIGS. 1–9 is equipped with a closable door 60. Door 60 is pivotally attached to the housing 40 by a spring-biased hinge 62. Other attachment arrangements may also be successfully employed. A latch member 66 is attached to the door 60 for engaging a corresponding detent 41 or groove in the housing 40 to selectively retain the door 60 in a closed position after the camera 12 has been installed therein. To prevent the camera 12 from moving when it is installed within the housing 40, one or more immobilizing strips 70 of cushioning material such as commercially available adhesive-backed foam tape may be used as shown in FIG. 8. As can be seen in that Figure, three strips of immobilizing tape 70 (two on door 60 and one on the front portion 42 of the housing 40) are employed. Thus, by latching the door, the camera 12 is immobilized within the housing 40 by the tape strips 70.

In this embodiment of the present invention, a beam projecting device 80 is affixed to the housing 12 by a socket member 72 attached to the bottom surface 45 of the housing 40. The beam projecting device 80 may comprise a commercially available laser pointing device such as that device manufactured by Tru-Nord of Brainerd, Minn. However, other beam generating devices may be employed. The beam projection device 80 of the type depicted in the Figures includes a metallic case 82 and an actuator clip 84 that can be biased into contact with the case 82 to actuate the device 80 and cause it to emit a beam of light out of its light emitting end 85. Those of ordinary skill in the art will appreciate that the aforementioned beam projecting device 80 can provide differently shaped beams by rotating a cap 86 located at the light emitting end 85 of the device 80.

Figure 5:
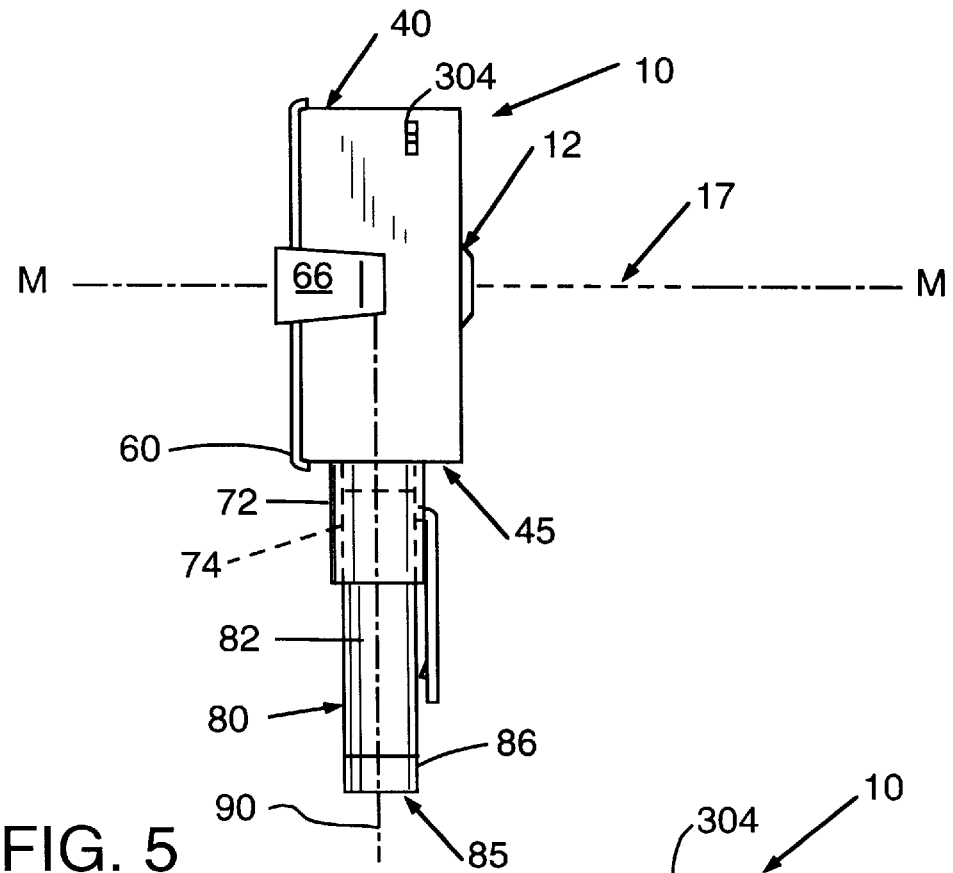
FIG. 5 is a right side view of the housing and camera of FIGS. 1–4.
Figure 6:
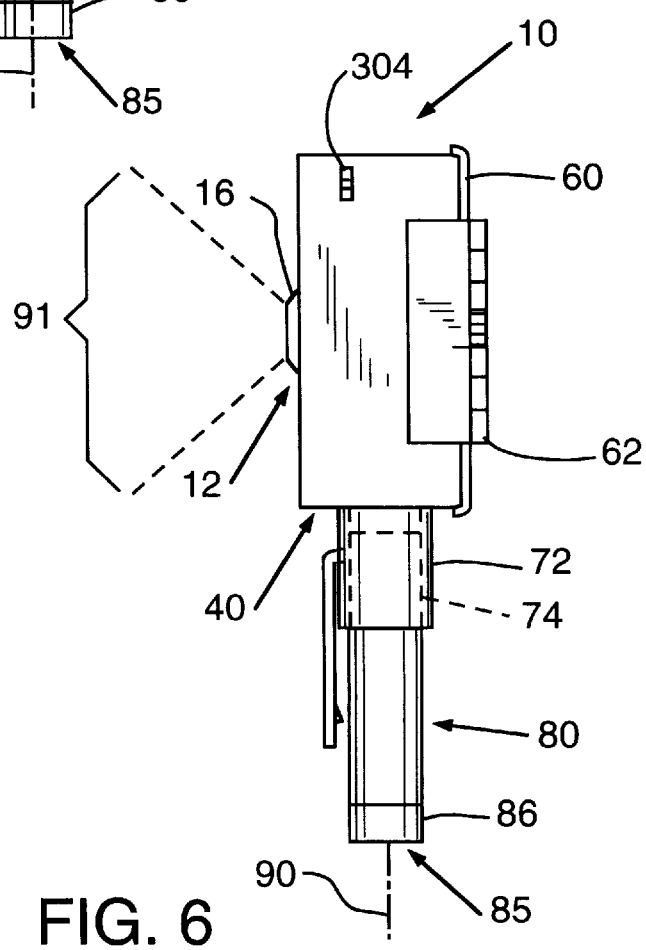
FIG. 6 is a left side view of the housing and camera of FIGS. 1–5.
Figure 7:
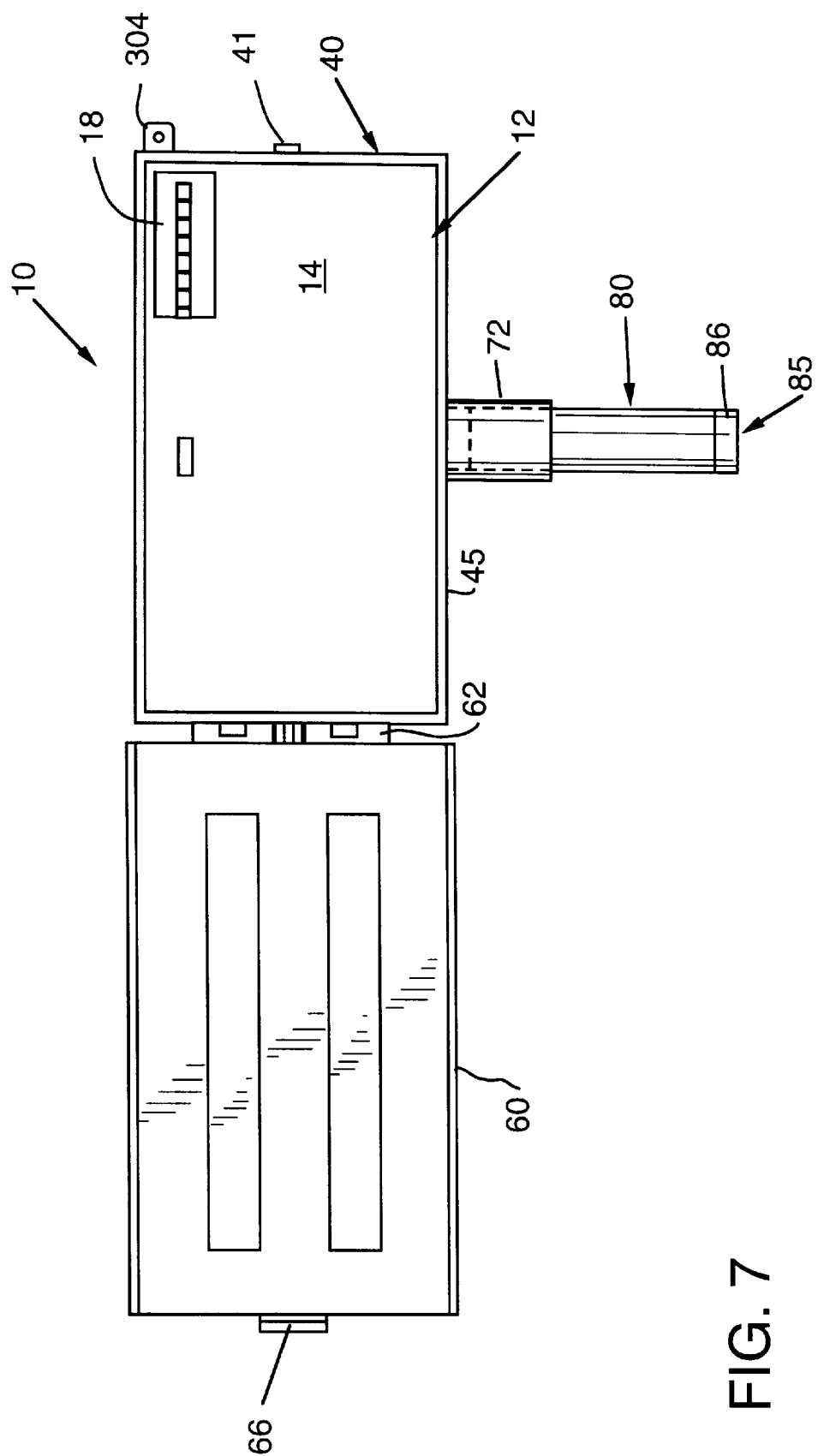
FIG. 7 is a rear view of the housing and camera of FIGS. 1–6 with the door of the housing in an open position.

As noted above, in this embodiment, the beam projecting device 80 is attached to the bottom surface 45 of the housing 40 by a socket member 72. Socket member 72 may be integrally formed with the housing 40 or it may be attached to the bottom surface 45 of the housing 40 by appropriate adhesive, welding, threads, etc. that is compatible with the materials comprising the housing 40 and the socket member 72. Socket member 72 is sized to receive at least a portion of the beam projecting device 80 therein and retain it therein by a friction fit generated between the device case 82 and the inner wall 74 of the socket member 72. If the socket member 72 is fabricated from an electrically conductive material such as steel, a beam projector 80 of the type described above will be activated when it is inserted into the socket member 72. To accommodate the actuator clip 84, a slot 76 is provided in the socket member 72 as shown in FIG. 1. The slot 76 is so oriented such that when the actuator clip 84 is inserted into the slot 76, the beam projector 80 is strategically oriented relative to the housing 40 to thereby orient the projected beam (represented by the dotted line 90) in a desired orientation as will be discussed in further detail below. The skilled artisan will appreciate that the camera lens and shutter assembly 16 has a "field of view" that extends outward from the front of the lens (represented by dotted lines 91 in FIG. 6) and that the projected beam (represented by dotted line 90) is outside of the field of view such that when a photograph is taken, the beam is not in the photograph. It will be further appreciated that the camera lens 16 has a centrally disposed optical or central axis 17 that lies along plane M—M as shown in FIG. 5. As can also be seen in FIG. 5, the projected beam 90 is substantially perpendicular to that central axis 17. Such slot 76 also permits the user to actuate the actuator clip 84 (i.e., bias the clip 84 into contact with the projector case 82) or other member to activate the beam projector 80. Those of ordinary skill in the art will appreciate that other beam projectors and methods of attaching the beam projector 80 to the housing 40 may be successfully employed without departing from the spirit and scope of the present invention. It will be further appreciated that the housing member 40 may be provided in a variety of other configurations and arrangements. For example, housing member 40 may comprise a plate that can be fastened (i.e., clipped, glued, screwed, etc.) onto the bottom of the disposable camera housing. A mounting socket or other member for attaching a beam projecting device 80 to that plate would be attached to or integrally formed with the plate.

Figure 2:
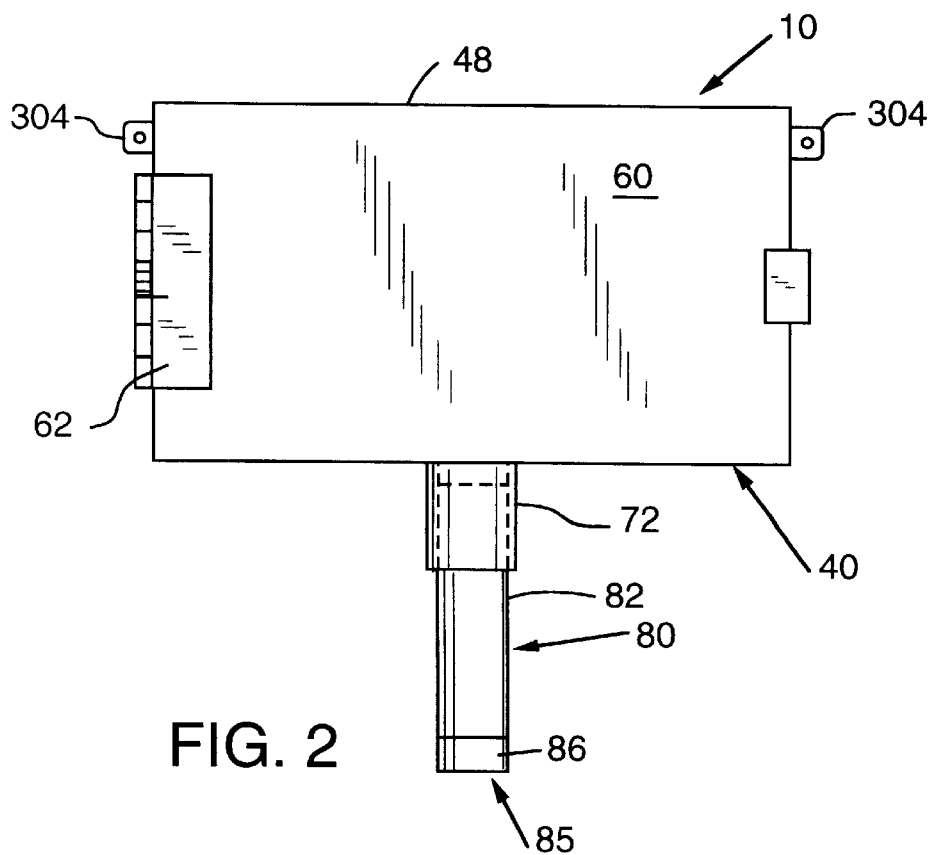
FIG. 2 is a rear view of the housing and camera assembly of FIG. 1.
Figure 2A:
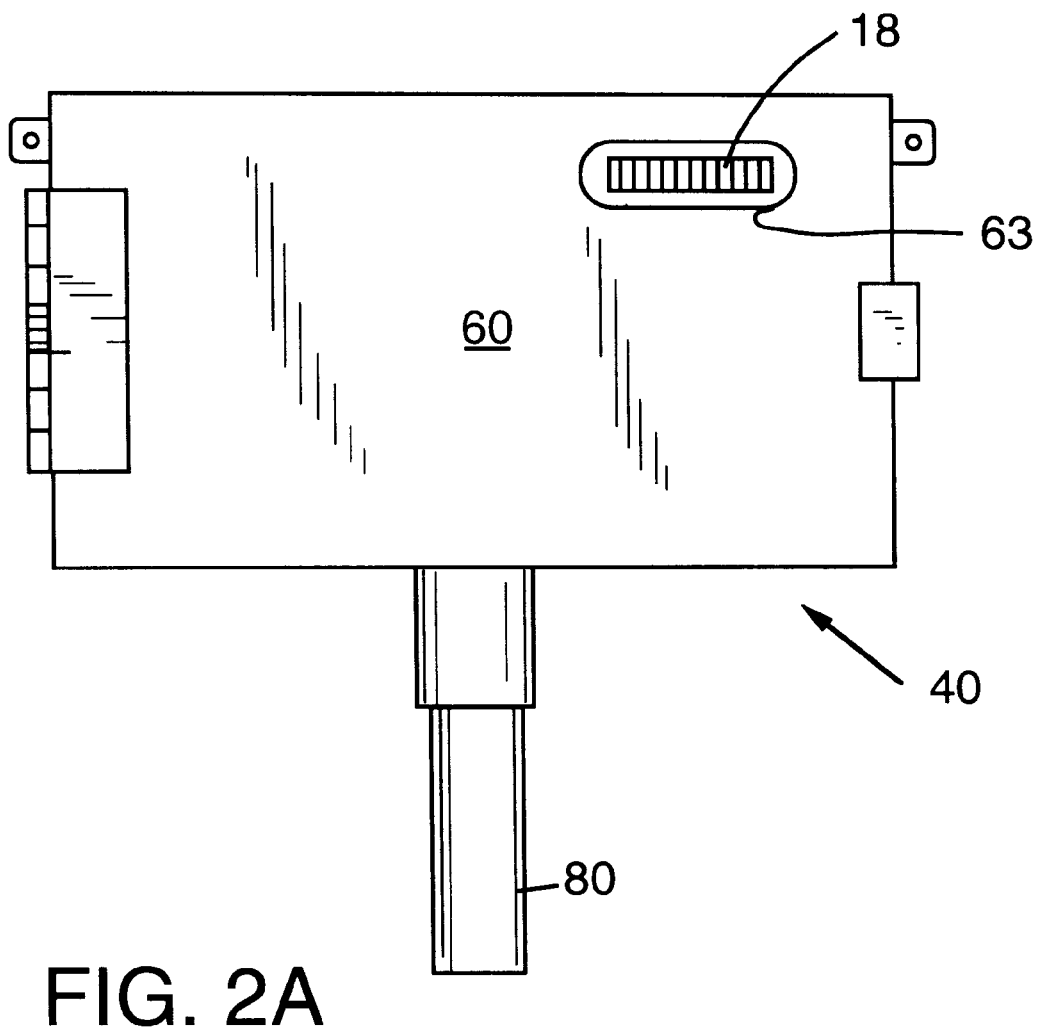
FIG. 2A is a rear view of an alternate housing embodiment of the present invention for housing a disposable camera therein.

The use of housing 40 in connection with camera 12 will now be explained. As shown in FIG. 1, the camera 12 is placed into the housing 40 and the door 60 is closed and latched. In this embodiment, the film should be advanced to a ready position prior to installing the camera 12 in the housing 40. If desired, an additional opening 63 may be provided in the door 60 to provide access to the film advancing mechanism 18 without the need to open the door 60 each time the film must be advanced. See FIG. 2A.

Figure 12:
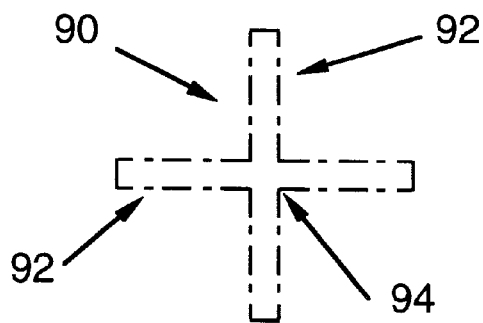
FIG. 12 is a view of a projected beam of the subject invention.
Figure 12A:
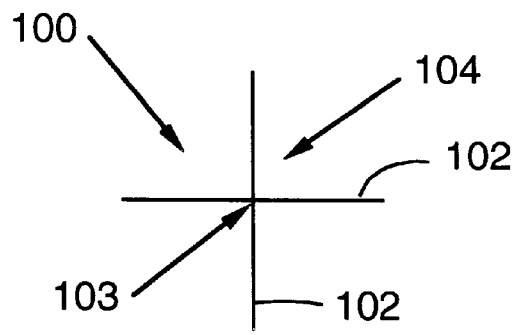
FIG. 12A is a view of a reference point that may be used in connection with the beam of FIG. 12 to selectively index a camera or other object four times.

The beam projector 80 is installed in the socket 72 as shown in FIG. 1. Appropriate caution should be taken to avoid direct eye exposure to the beam 90. For the purpose of this example, the beam projector 80 is adjusted (by rotating the cap 86) to emit a beam of light 90 having the configuration depicted in FIG. 12. However, as will be discussed in further detail below, other beam configurations may be successfully employed.

Figure 10:
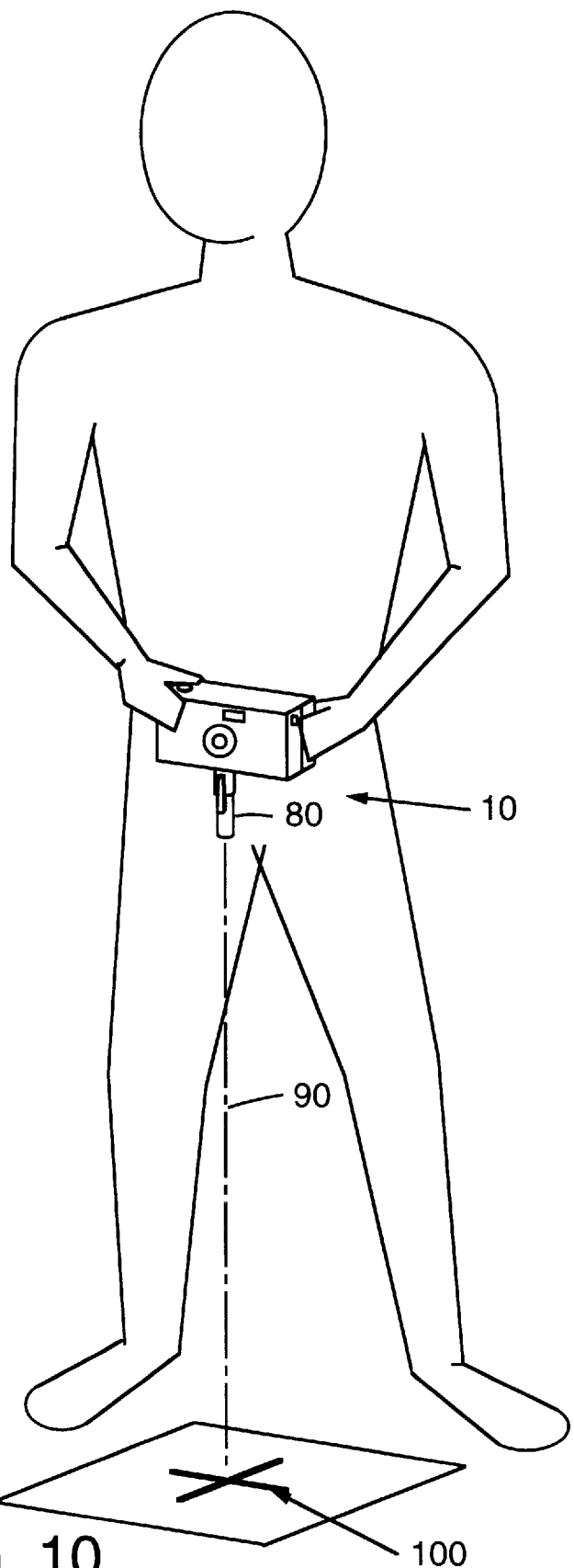
FIG. 10 is a perspective view showing a user utilizing the present invention.
Figure 11B:
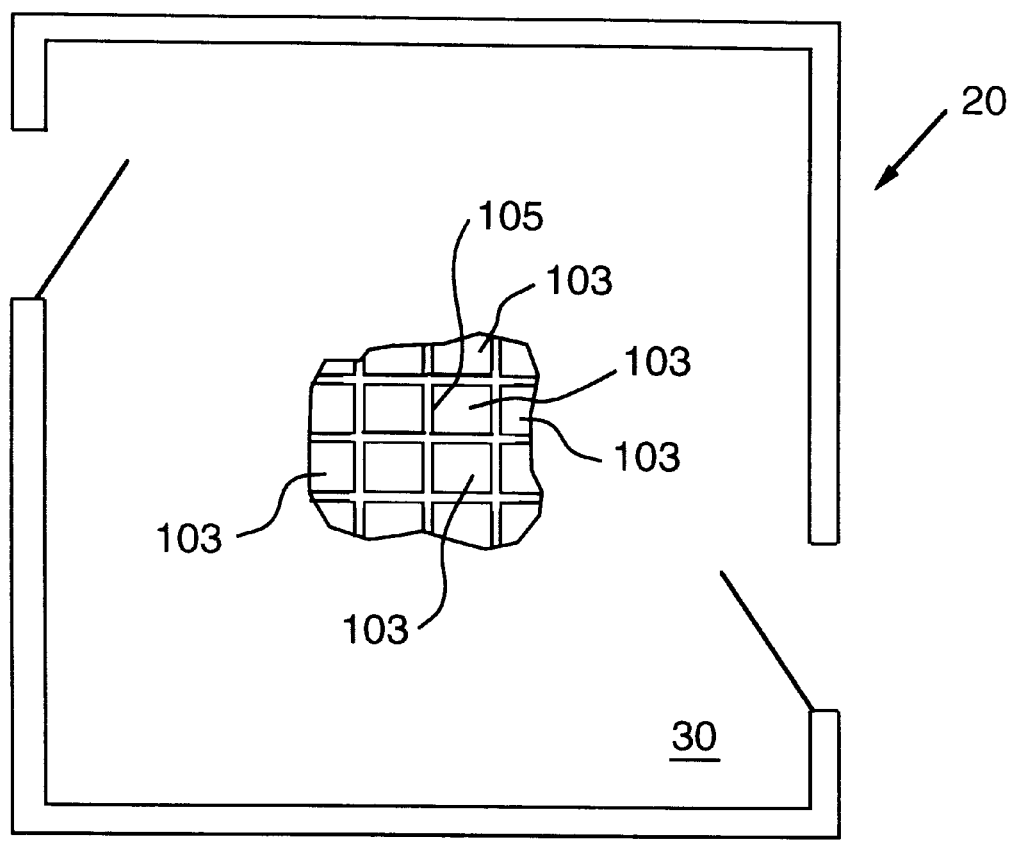
FIG. 11B is a plan view of another room that has floor tile installed therein which can be used to establish a reference point.

To facilitate relatively precise indexing of the housing 40 (and the camera 12) between photographs, a reference point 100 is established. As can be seen in FIG. 11, in this example, the reference point 100 is established on the floor 30 in the approximate center of the room 20. By establishing the reference point 100 in the center of the room 20, the camera lens 16 will be the same distance from each wall (22, 24, 26, 28) as it is indexed about the reference point 100. Those of ordinary skill in the art will appreciate, however, that the reference point 100 could be established in other locations and on other surfaces. To avoid marking the floor, the reference point 100 may be printed on a removable mat 110 that may be selectively placed on the floor 30. See FIGS. 10 and 11. Alternatively, the reference point 100 may be printed on a label that has an adhesive backing to enable the reference point to be established on non-horizontally oriented surfaces, objects, etc. In those applications wherein square or rectangular floor tile 103 is installed on the floor 30 of the room 20, the reference point may comprise a corner 105 of a selected floor tile 103. See FIG. 11B.

Figure 12B:
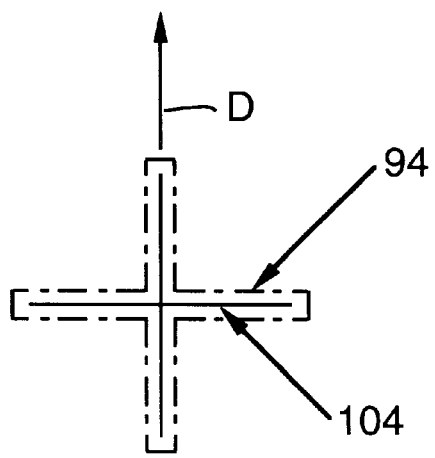
FIG. 12B is a view of the projected beam of FIG. 12 superimposed over the reference point of FIG. 12A in a first position.
Figure 13:
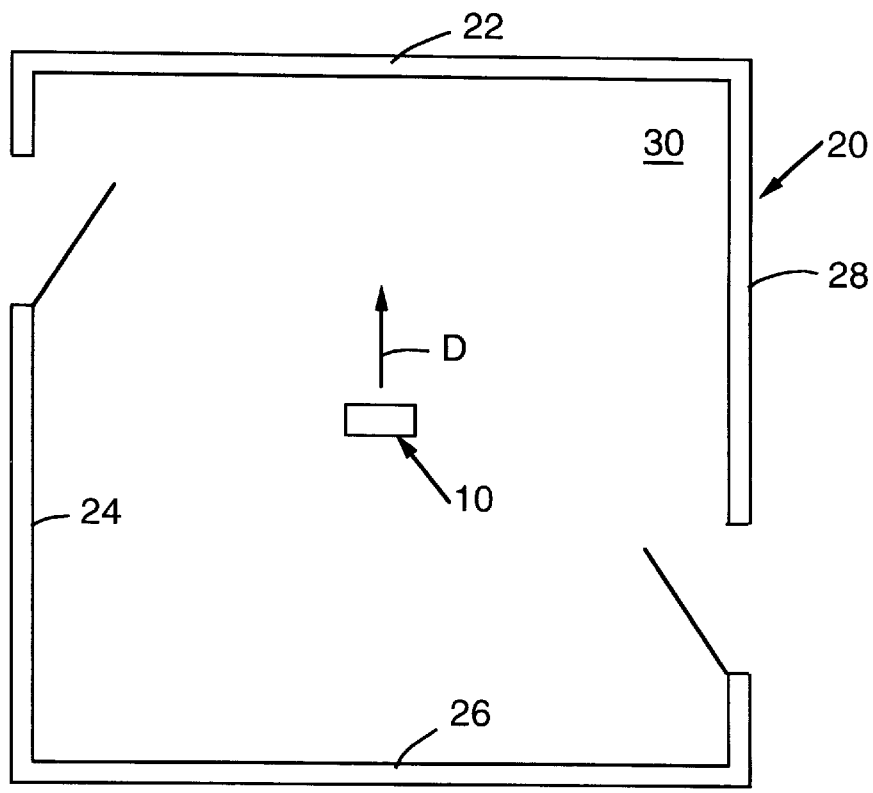
FIG. 13 is a plan view of a room showing the camera housing in a first position that corresponds to the position illustrated in FIG. 12B.

In the present example, the beam 90 comprises four beam segments 92 that intersect to form a cross 94. See FIG. 12. To obtain four indexes of the camera 12 about the reference point 100, reference point 100 can be similarly configured with four lines 102 that intersect to form a cross 104. After the reference point 100 has been established on the floor 30, the beam projection device 80 is activated and the appropriate beam configuration 90 which forms cross 94 is selected. Thereafter, the housing 40 that now has the camera 12 therein is oriented above the reference point (see FIG. 10A) such that cross 94 is superimposed over the reference point cross 104 as shown in FIG. 12B. Such orientation of the housing 40 causes the lens 16 of the camera 12 to face one of the walls (22, 24, 26, 28)in this example wall 22. See FIG. 13. After the cross 94 is superimposed over the reference cross 104 as shown in FIG. 12B (arrow "D" represents the direction in which the camera lens 16 is facing), a photograph of the wall 22 is taken by pressing the camera actuation button 20. The reader will appreciate that the width of the beam segments 92 and other beam segments depicted herein in the Figures are shown to be wider than the reference lines 102 for illustrative purposes only. The beam segments 92 may have the same widths, smaller widths, or larger widths than the reference lines 102 and may be longer or shorter than such reference lines 102.

Figure 12C:
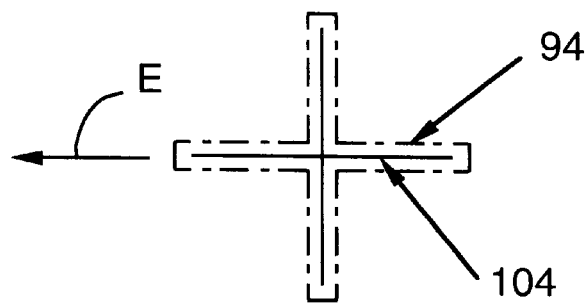
FIG. 12C is a view of the projected beam of FIG. 12 superimposed over the reference point of FIG. 12A in a second position.
Figure 12D:
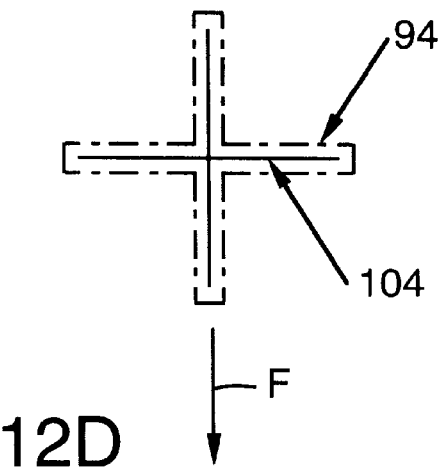
FIG. 12D is a view of the projected beam of FIG. 12 superimposed over the reference point of FIG. 12A in a third position.
Figure 12E:
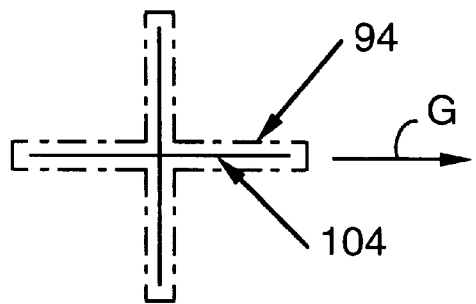
FIG. 12E is a view of the projected beam of FIG. 12 superimposed over the reference point of FIG. 12A in a fourth position.
Figure 13A:
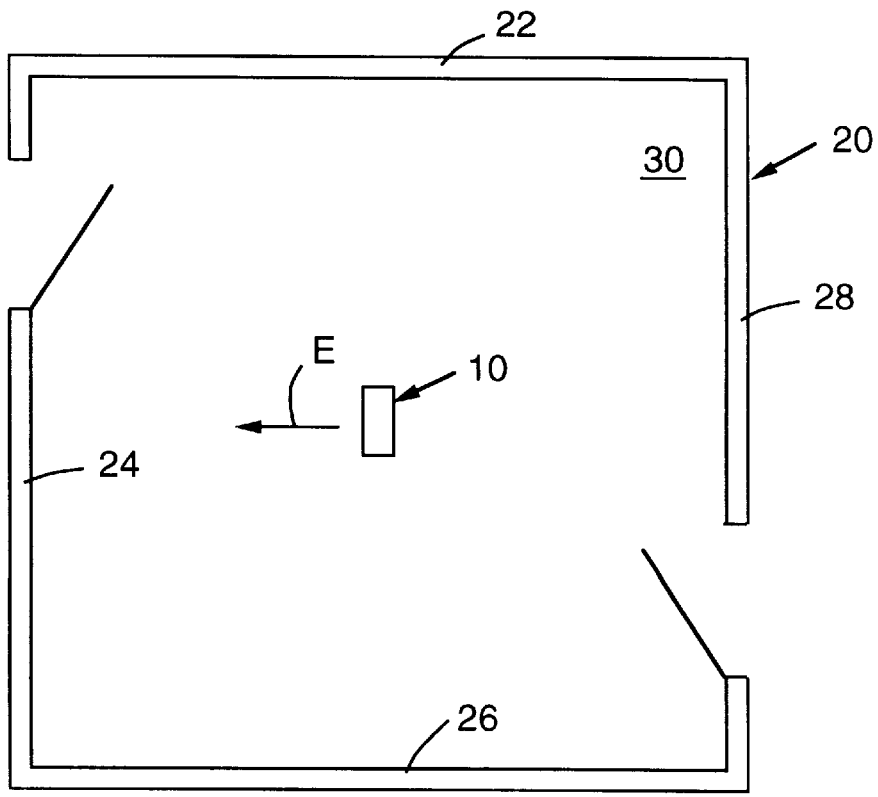
FIG. 13A is another plan view of the room of FIG. 13 showing the camera housing in a second position that corresponds to the position illustrated in FIG. 12C.
Figure 13B:
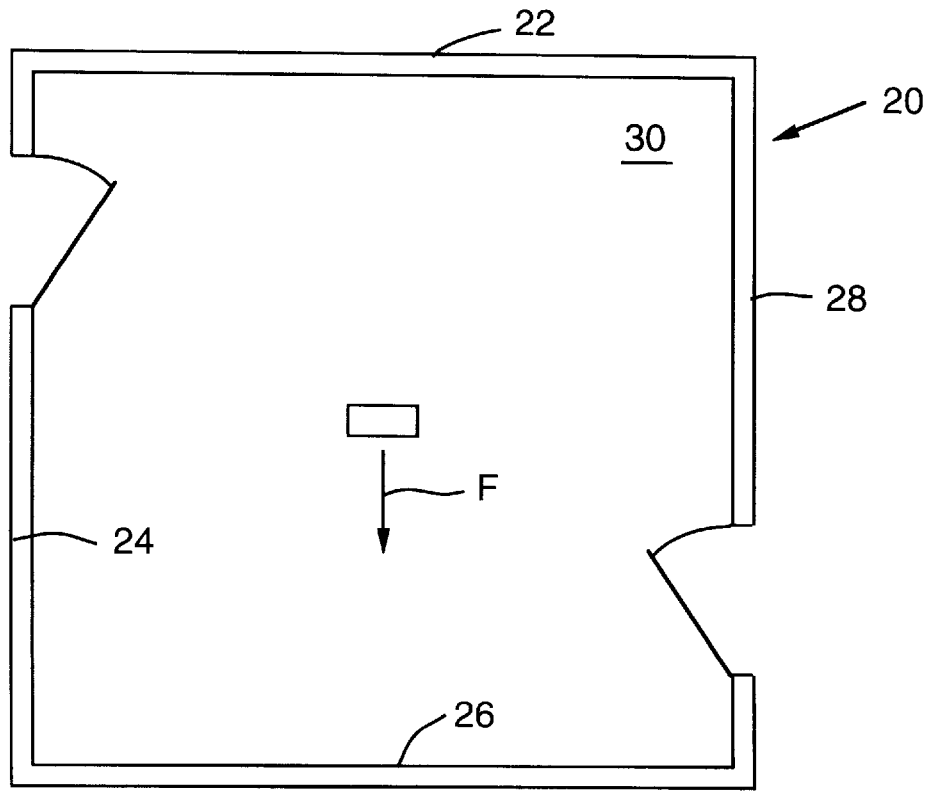
FIG. 13B is another plan view of the room of FIG. 13 showing the camera housing in a third position that corresponds to the position illustrated in FIG. 12D.
Figure 13C:
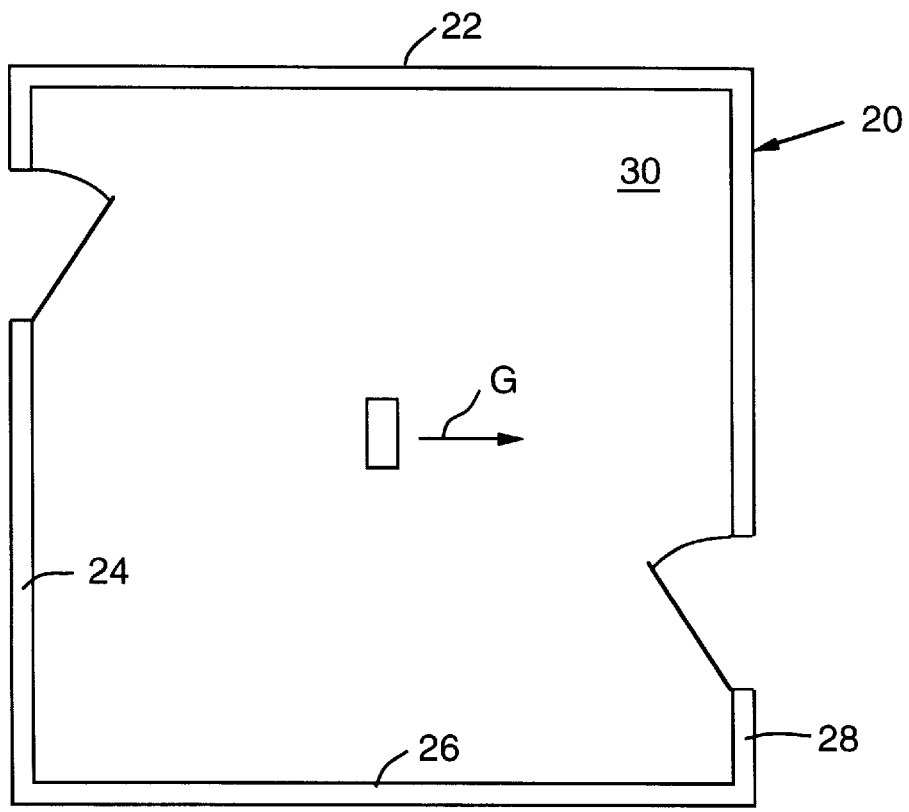
FIG. 13C is another plan view of the room of FIG. 13 showing the camera housing in a fourth position that corresponds to the position illustrated in FIG. 12E.

After the first photograph has been taken, the user then advances the film and then indexes the housing 40 90° about the index axis B—B such that the lens 16 is facing wall 24. See FIG. 13A. The beam cross 94 is again superimposed over the reference cross 104 (arrow "E" represents the direction in which the camera lens 16 is facing). See FIGS. 12C and 13A. Thereafter, the user takes a second photograph. After the photograph of wall 24 has been taken, the film is advanced and the housing 40 is indexed another 90° such that the lens 16 faces wall 26 and the beam cross 94 is again superimposed on the reference cross 104 (arrow "F" represents the direction in which the camera lens 16 is facing). See FIGS. 12D and 13B. The user then photographs wall 26. The film is advanced and the housing 40 is indexed a final 90° such that the camera lens 16 faces wall 28. The beam cross 94 is superimposed over the reference cross 92 (arrow "G" represents the direction in which the camera lens 16 is facing) and the final photograph is taken. See FIGS. 12E and 13C. The user will appreciate that such method permits the user to take four photographs about a common index axis B—B defined by point 101 (the point wherein reference lines 102 intersect). It will be appreciated that each line 102 of the reference point 100 defines a reference orientation that corresponds with a predetermined direction in which the camera lens 16 faces when the beam 90 is aligned therewith.

Figure 14:
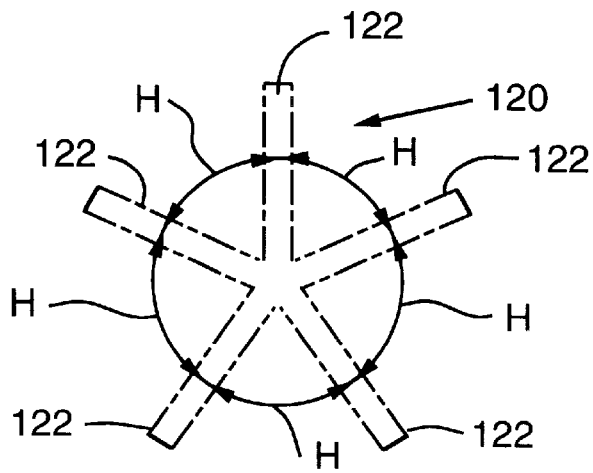
FIG. 14 is a view of another projected beam of the subject invention.
Figure 14A:
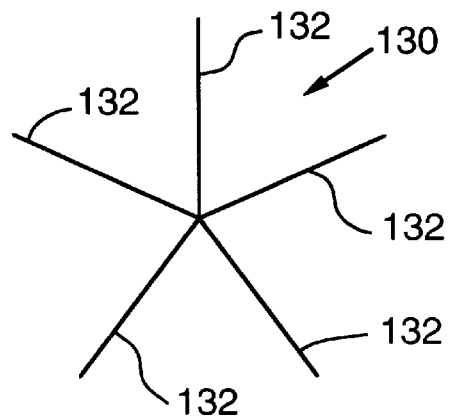
FIG. 14A is a view of a reference point that may be used in connection with the beam of FIG. 14 to selectively index a camera or other object five times.
Figure 14B:
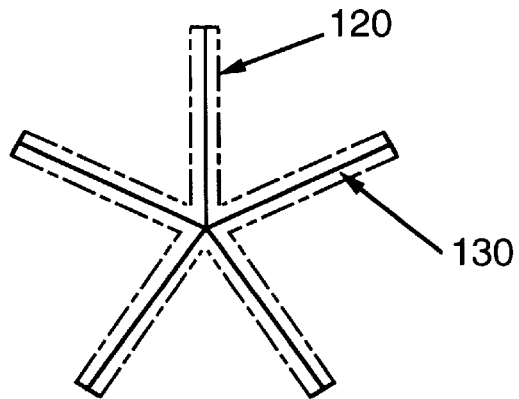
FIG. 14B is a view of the projected beam of FIG. 14 superimposed over the reference point of FIG. 14A in one of five positions.

A variety of beam configurations and reference points may be employed without departing from the spirit and scope of the subject invention. As used herein, the term reference point may comprise a single point or a plurality of reference orientation lines that define a direction in which the camera lens is to face. For example, the beam projector 80 may project a beam arrangement 120 that comprises five beam segments 122 as shown in FIG. 14. Such beam arrangement can be used with a reference point 130 that comprises five correspondingly oriented reference lines 132. See FIG. 14A. The reference lines 132 define reference orientations that correspond to the various directions in which the camera lens 16 can be oriented to face during the photographic process. Thus, in that embodiment, when the beam arrangement 120 is superimposed over the reference point 130 as shown in FIG. 14B and indexed in the above-described manner, the housing 40 (and camera 12) is indexed five times with approximately 72° (angles "H" in FIG. 14) between each photograph.

Figure 15:
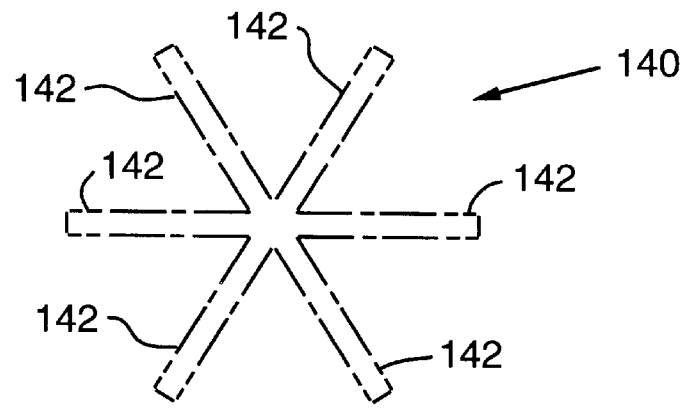
FIG. 15 is a view of another projected beam of the subject invention.
Figure 15A:
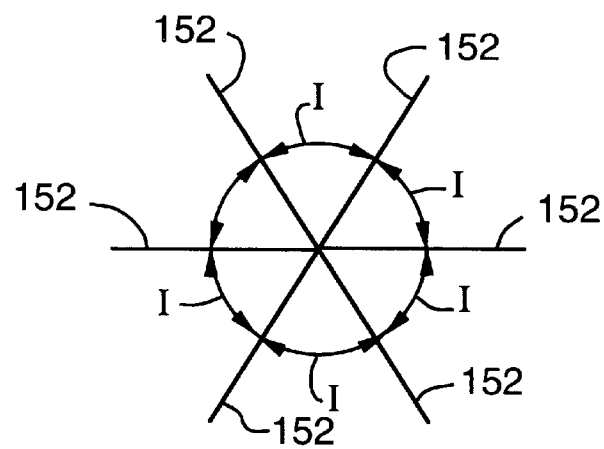
FIG. 15A is a view of a reference point that may be used in connection with the beam of FIG. 15 to selectively index a camera or other object six times.
Figure 15B:
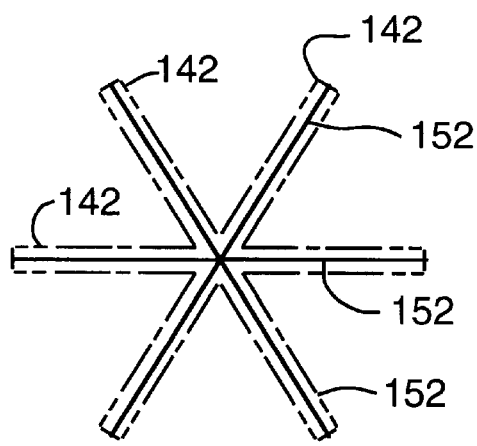
FIG. 15B is a view of the projected beam of FIG. 15 superimposed over the reference point of FIG. 15A in one of six positions.

FIG. 15 depicts a beam configuration 140 that includes six intersecting beam segments 142 which can be used in connection with a reference point 150 that has six correspondingly oriented intersecting lines 152 as shown in FIG. 15A. The reference lines 152 define reference orientations that correspond to the various directions in which the camera lens 16 faces during the photographic process. Thus, in that embodiment, when the beam arrangement 140 is superimposed over the reference point 150 as shown in FIG. 15B and is indexed in the above-described manner, the housing 40 (and camera 12) is indexed six times with approximately 60° (angle "I" in FIG. 15A) between each photograph.

Figure 16:
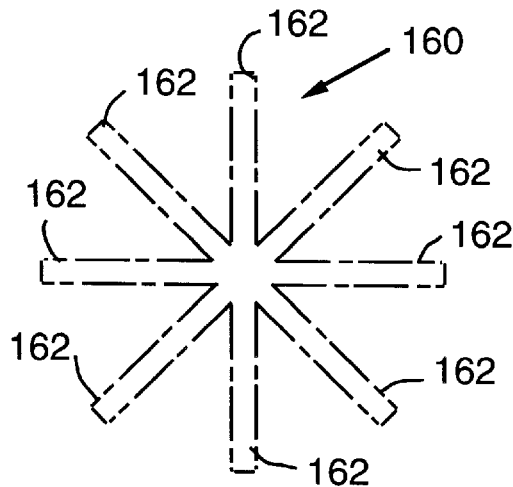
FIG. 16 is a view of another projected beam of the subject invention.
Figure 16A:
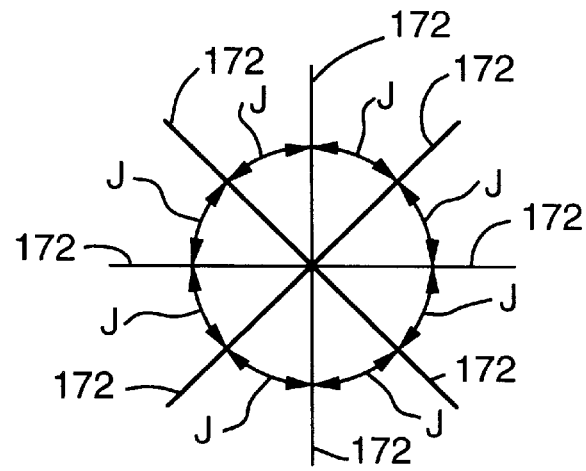
FIG. 16A is a view of a reference point that may be used in connection with the beam of FIG. 16 to selectively index a camera or other object eight times.
Figure 16B:
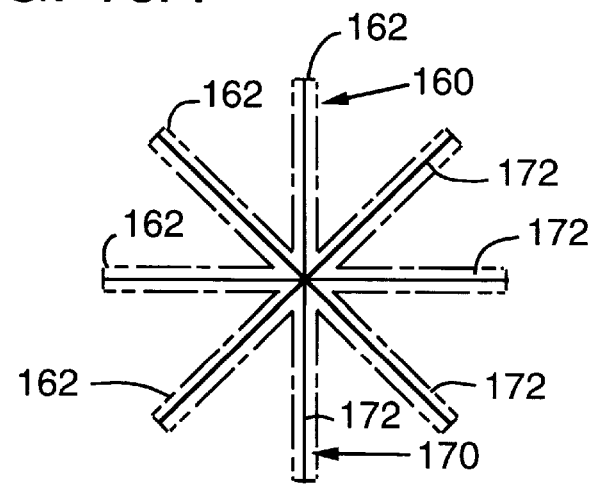
FIG. 16B is a view of the projected beam of FIG. 16 superimposed over the reference point of FIG. 16A in one of eight positions.

FIG. 16 depicts a beam configuration 160 that includes eight intersecting beat segments 162 that can be used in connection with a reference point 170 that has eight correspondingly oriented intersecting lines 172 as shown in FIG. 16A. The reference lines 172 define reference orientations that correspond to the various directions in which the camera lens 16 faces during the photographic process. Thus, in that embodiment, when beam arrangement 160 is superimposed over the reference point 170 as shown in FIG. 16B and indexed in the above-described manner, the housing 40 (and camera 12) is indexed eight times with approximately 30° (angle "J" in FIG. 16A) between each photograph.

Figure 17:
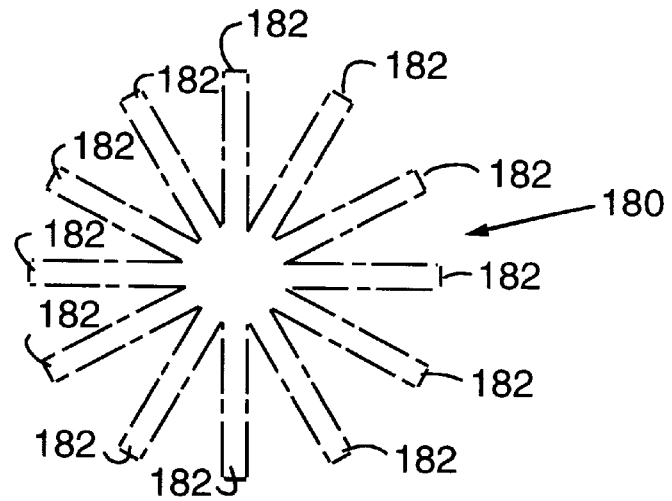
FIG. 17 is a view of another projected beam of the subject invention.
Figure 17A:
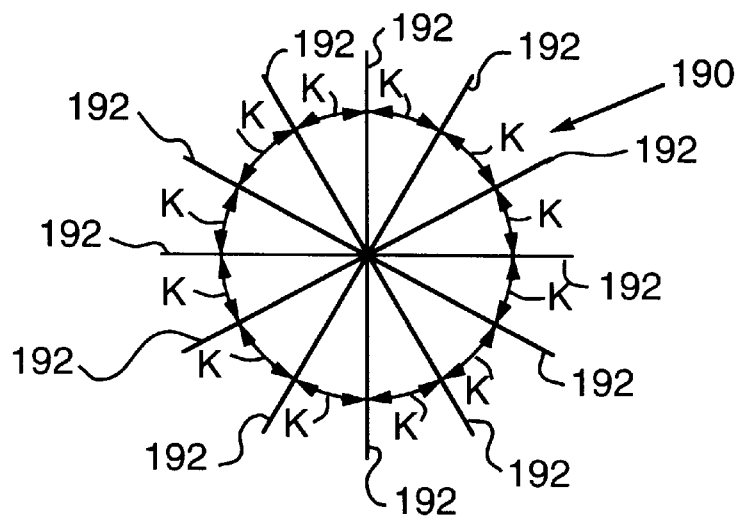
FIG. 17A is a view of a reference point that may be used in connection with the beam of FIG. 17 to selectively index a camera or other object twelve times.
Figure 17B:
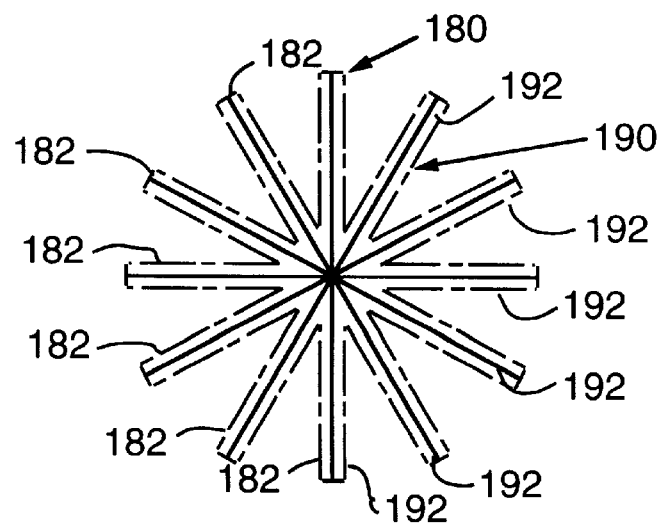
FIG. 17B is a view of the projected beam of FIG. 17 superimposed over the reference point of FIG. 17A in one of twelve positions.

FIG. 17 depicts a beam configuration 180 that includes twelve intersecting beam segments 182 that can be used in connection with a reference point 190 that has twelve correspondingly oriented intersecting lines 192 as shown in FIG. 17A. The reference lines 192 define reference orientations that correspond to the various directions in which the camera lens 16 faces during the photographic process. Thus, in that embodiment, when the beam configuration 180 is superimposed over the reference point 190 as shown in FIG. 17B and is indexed in the above-described manner, the housing 40 (and camera 12) is indexed twelve times with approximately 30° (angle "K" in FIG. 17A) between each photograph.

Figure 18:
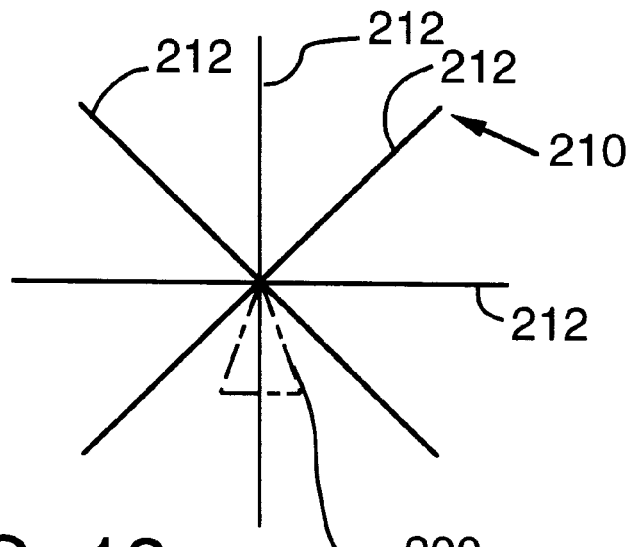
FIG. 18 is a view of another beam and reference point of the subject invention.
Figure 19:
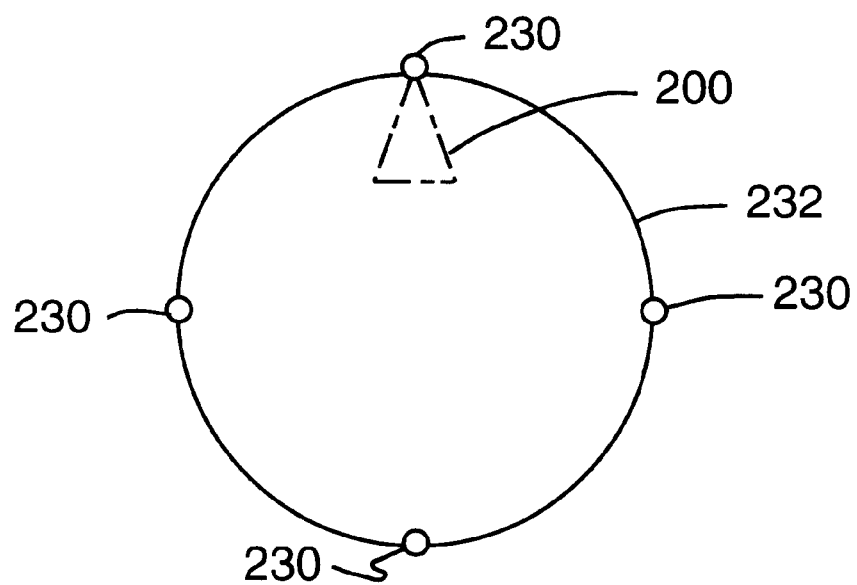
FIG. 19 is a view of another beam and reference point of the subject invention.

In another embodiment, the beam may comprise an arrow 200 that is adapted to be oriented relative to a reference point 210 consisting of a plurality of reference lines 212 (FIG. 18) or, for example, a plurality of reference marks 230 spaced at desired intervals on a common circumference 232 (FIG. 19). It will therefore be apparent from the foregoing discussion that a variety of different beam and reference point configurations can be successfully employed without departing from the spirit and scope of the present invention.

Figure 3:
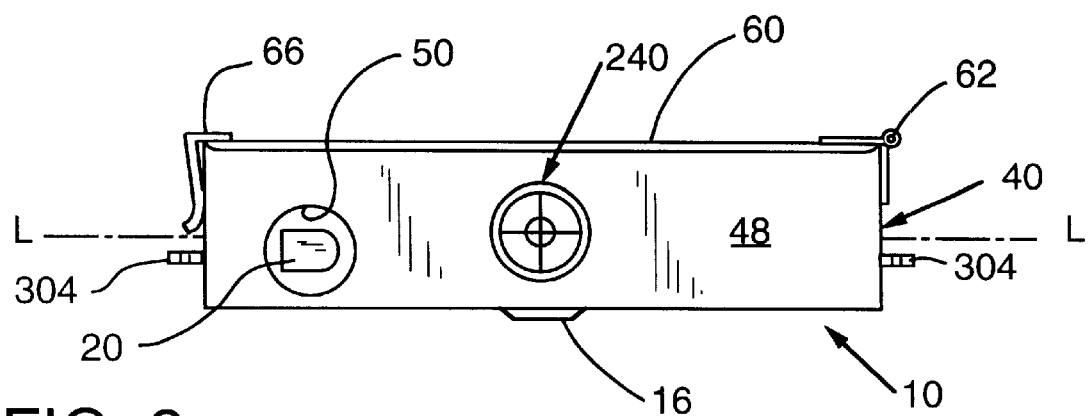
FIG. 3 is a top view of the housing and camera of FIGS. 1 and 2.
Figure 4:
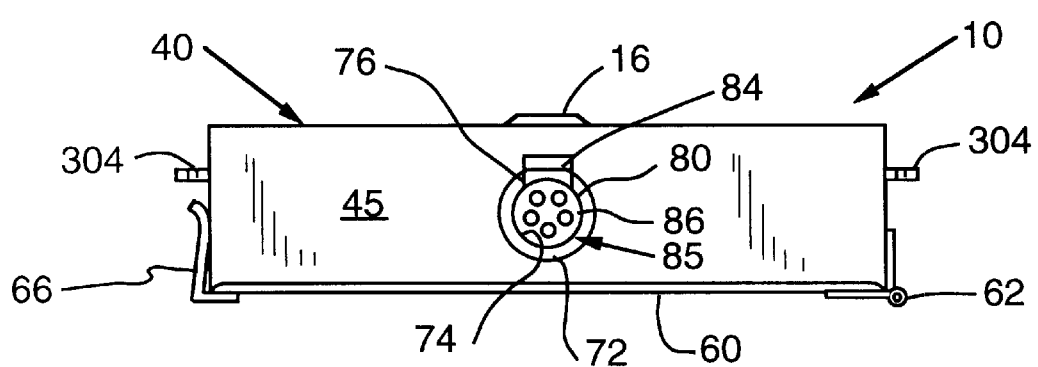
FIG. 4 is bottom view of the housing and camera of FIGS. 1–3.

To facilitate leveling of the housing 40 (and camera 12) each time a photograph is taken, a commercially available bubble level 240 may be attached to the upper portion 48 of the camera housing 40 as shown in FIG. 3. Bubble level 240 may comprise the type of commercially available level that includes a single bubble that is centered within the level housing when the device to which it is attached is level. In the alternative, two commercially available elongated bubble levels 250 may be attached to the upper surface 48 of the camera housing at orientations perpendicular to each other such that one bubble level 250 can be used to level the camera in a first plane (represented by line L—L in FIG. 3) and the other bubble level 250 can be used to level the housing 30 (and camera 12) in a second plane (represented by line M—M in FIG. 5).

Figure 20:
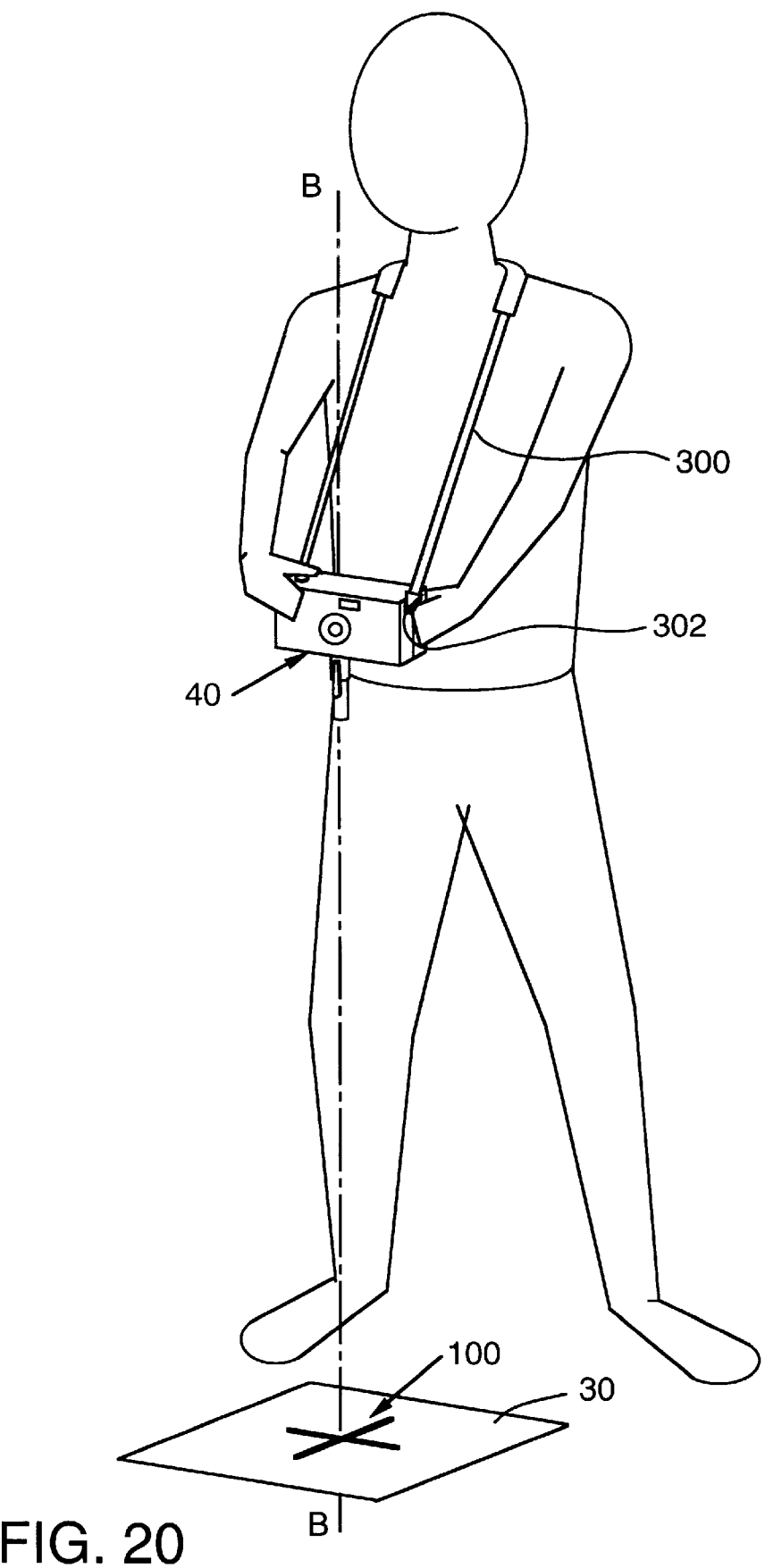
FIG. 20 is a view of a user using the present invention in connection with a neck strap as taught by the present invention.

In an alternative embodiment, the housing 40 can be maintained at a relatively constant height and level orientation above the floor 30 by employing a neck strap 300 to support the housing 40 around a user's neck. More particularly and with reference to FIG. 20, the neck strap 300 is attached to the ends of the housing 40 by conventional attachment rings or other suitable attachment members. The strap 300 is placed around the user's neck and the housing 40 is positioned at a desired height above the floor 30. After the desired height is achieved, the housing 40 is moved toward or way from the user's body until an amount of tension is developed in the strap 300 while maintaining the housing 40 at the desired height. Thereafter, the user locks or retains his or her arms in that position to maintain that amount of tension in the strap 300. The user's arms are retained in that position while the user rotates his or her body around the indexing axis B-B to a desired position and superimposes the beam over the reference point in the above-mentioned manner. In the example depicted in FIG. 20, the user could index an appropriate camera four times and take four photographs to achieve a "full panorama" view in the manner described above. To further ensure that the housing is level, the housing 40 may be equipped with a level 240 or levels 250 and the user can view the level(s) and tilt the housing 40 accordingly until a level indication is achieved prior to taking each photograph and while maintaining a relatively constant amount of tension within the strap 300. Thus, by employing the camera strap 300 in the above-mentioned manner, the user can keep the camera relatively level as it is indexed about a reference point 100 or index axis B—B that is defined by the reference point.

Figure 21:
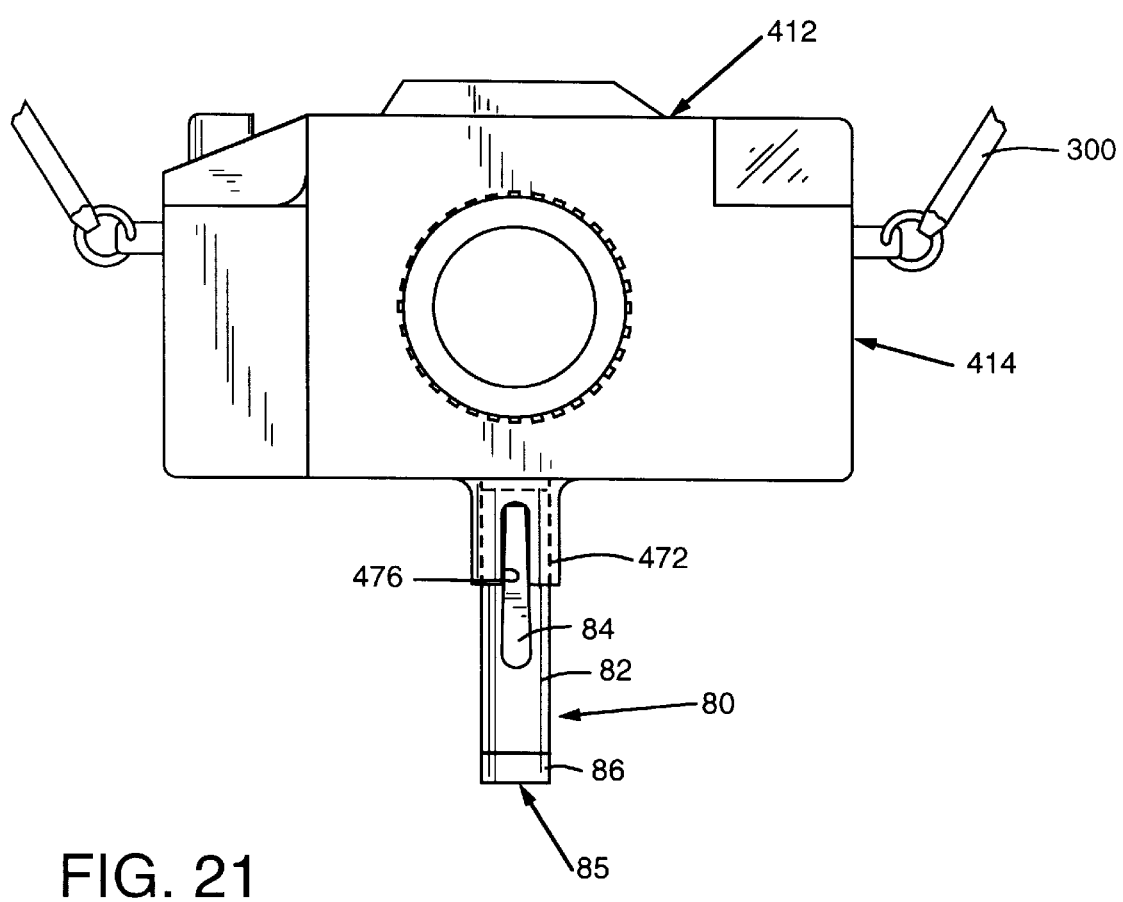
FIG. 21 is a view of another embodiment of the present invention wherein the socket is integrally formed with the housing of a camera.

FIG. 21 depicts another embodiment of the present invention wherein a mounting socket 472 is integrally formed with the housing 414 of a commercially available (non-disposable) camera 412. Socket 472 may similarly be provided with a slot 476 for receiving an actuator clip 84 or button of a beam projecting device 80. Such embodiment can then be used in the above-mentioned manners to index the camera 412 a desired amount of times about a correspondingly-shaped reference point 100. The reader will appreciate that the camera 412 may be equipped with a camera strap 300 which could be used in the aforementioned manner to keep the camera 412 relatively level and at a relatively constant height above the floor as it is indexed between photographs and during the taking of such photographs. In addition, a commercially available level or levels of the types described above may be attached to the top of the camera housing 414 by, for example, an appropriate adhesive medium, if so desired.

Figure 22:
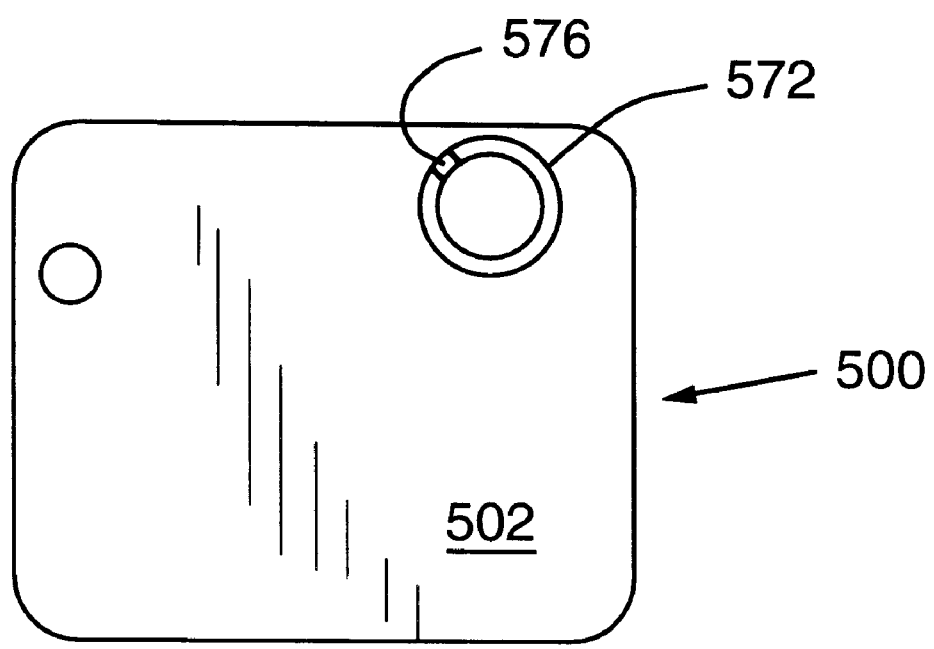
FIG. 22 is a bottom view of a mounting plate of an embodiment of the present invention.
Figure 23:
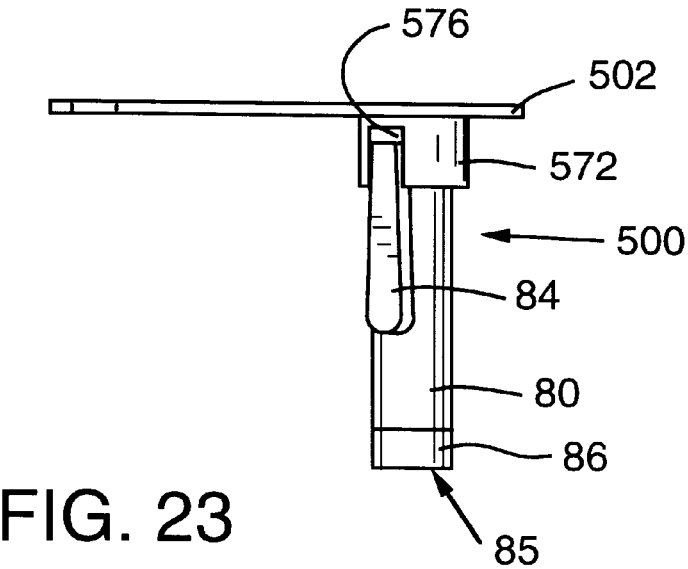
FIG. 23 is a side view of the mounting plate of FIG. 22 with a beam projection device attached thereto.
Figure 24:
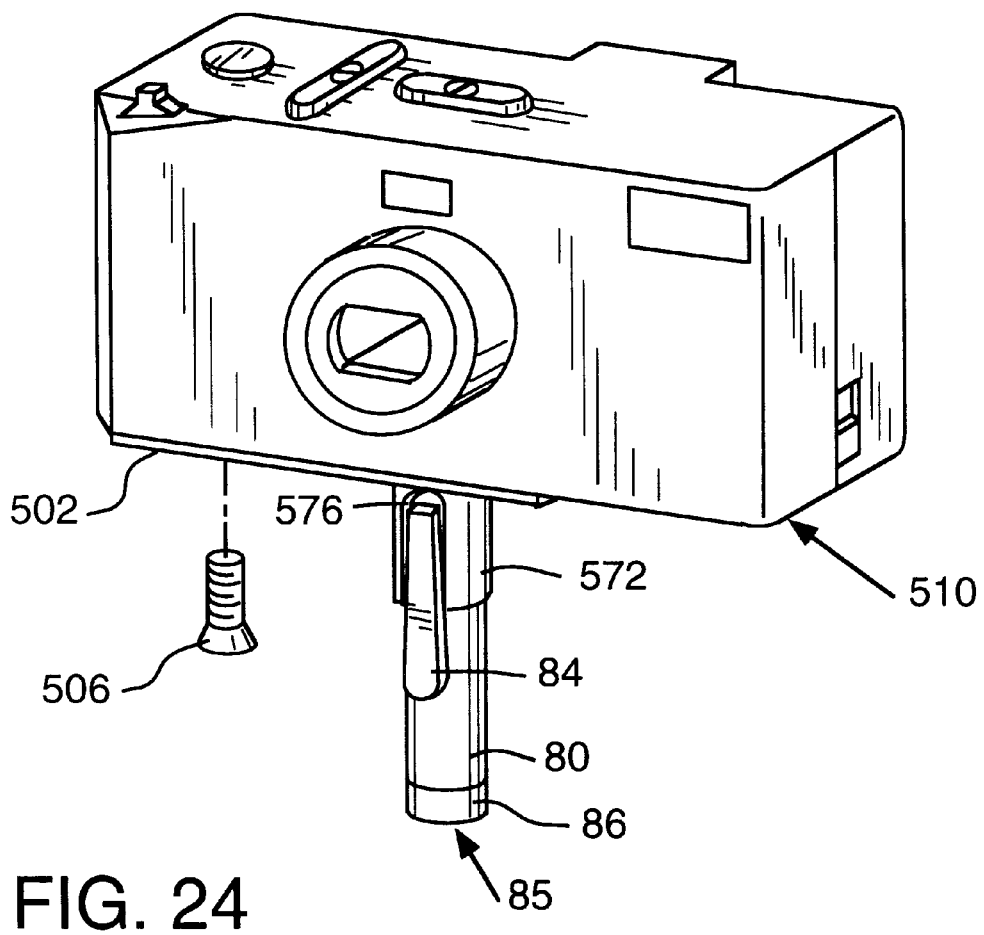
FIG. 24 is an assembly view showing the mounting plate of FIG. 23 attached to the bottom of a camera.

Another embodiment of the present invention comprises a mounting plate 500 that has a mounting socket 572 attached thereto. More particularly and with reference to FIGS. 22–24, the mounting plate 500 may comprise a flat plate 502 sized to be attached to a commercially available camera 512 or other object that is to be indexed. The skilled artisan will appreciate that the mounting plate may be fabricated from a variety of different materials. For example, the mounting plate 502 may be fabricated from a metallic material and have the socket 572 welded thereto. In the alternative, the plate 502 and socket 572 may be integrally molded together out of a polymeric material such as plastic, etc. As can be seen in FIGS. 22–24, the socket 572 is provided with a slot 576 for receiving the actuator clip 84 of the beam projector 80 therein. As was discussed above, the slot 576 can be used to strategically orient the beam projector 80*m* and also facilitates access to the actuator clip 84, button etc. As was also mentioned above, depending upon the type of beam projector 80 employed, if the socket 572 is fabricated from an electrically conductive material, the beam projector 80 may be activated simply by inserting it into the socket 572. However, other beam projectors 80 could also be used.

The mounting plate 502 may be attached to the bottom of the camera 512 by a screw 506 that extends through a hole 504 in the mounting plate 502. See FIG. 24. Many commercially available cameras have a threaded socket arrangement provided in the cameras bottom surface to enable the camera to be attached to a tripod. Such threaded socket is also well-suited for attaching the mounting plate 502 to the bottom of the camera 512 with a screw 506. After the mounting plate 502 has been affixed to the camera 512 and the beam projector 80 is supported within the mounting socket 572, the beam projector 80 and the camera 512 can be used in the above-mentioned manners to selectively index the camera 512 about a reference point/axis.

Figure 25:
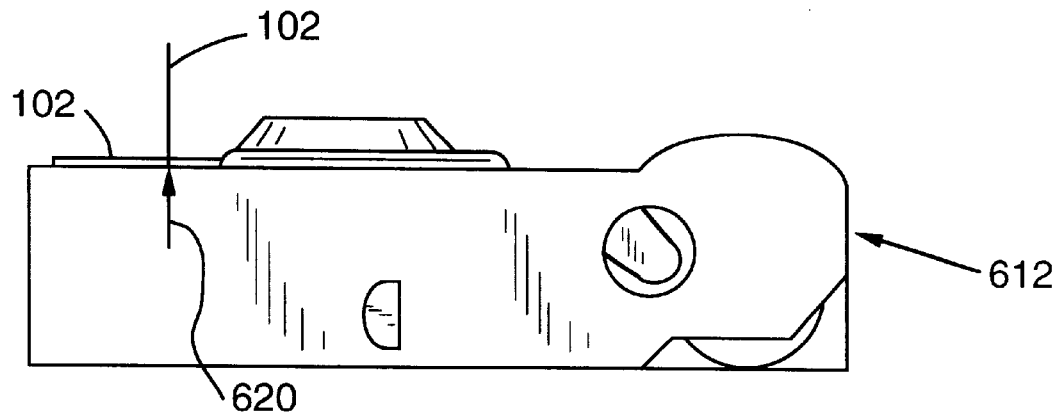
FIG. 25 is a top view of a camera employing another embodiment of the subject invention.

In immersive photographic applications wherein the relative accuracy between the sequentially taken photographs may be less important, a reference arrow or mark 620 may be provided on the top surface of the camera case 612 as shown in FIG. 25. Such reference mark 620 can then be used in conjunction with a reference point 100, for example, that is established on the floor to define index orientations for the camera 612. The mark 620 may be aligned with a first reference line 102 and the first photograph is taken. Thereafter, the camera 612 is indexed such that the mark 620 is aligned with a second reference line 102 and a second photograph is taken. The point of the arrow 620 is preferably aligned directly over the point wherein the lines 102 intersect and points along one of the lines 102 in the desired direction. This sequence is repeated until the desired number of photographs have been taken around the reference point 100.

Figure 26:
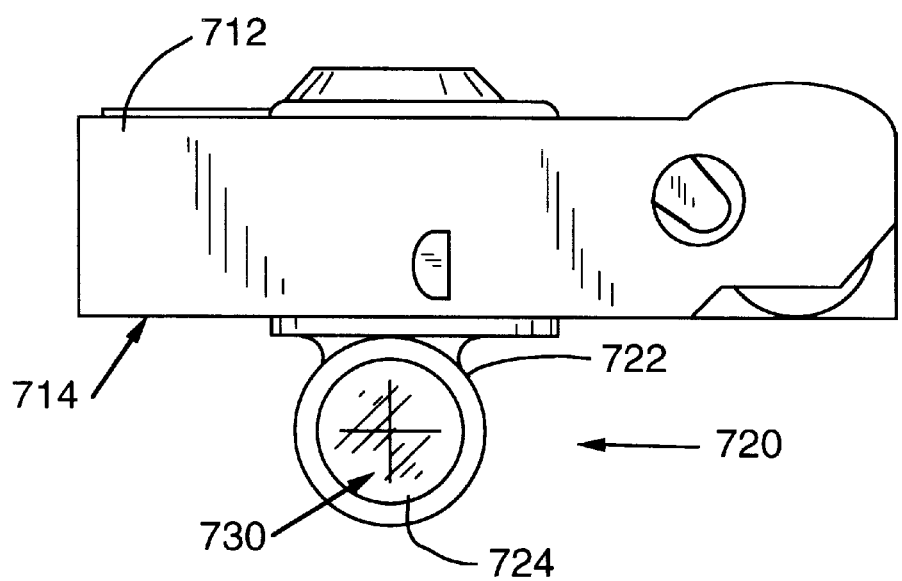
FIG. 26 is a top view of a camera employing another embodiment of the subject invention.

In another embodiment, a sighting device 720 may be attached to a camera 712 as shown in FIG. 26. As can be seen in that Figure, a mounting member 702 is integrally formed with or attached to the camera housing 714 by, for example, adhesive. When a disposable camera is employed, the mounting member 722 may be attached by an adhesive medium to the camera housing 714 or it may be attached to a housing member such as housing 40 as was described above. Mounting member 702 is shaped and configured to retain a sighting monocular 724 therein. Sighting monocular 724 could be fabricated from glass or plastic and may be fabricated to provide magnification if so desired. Sighting monocular 724 is provided with reference indicia or mark 730 that is adapted to be used in conjunction with a correspondingly shaped reference point in the above-described manners. The reference mark 730 on the monocular 724 is analogous to the beam configurations described above. Thus, the reference mark may be provided in a variety of different shapes that define a desired number of index orientations. To use this embodiment, the user looks through the monocular 724 and aligns the reference mark 730 with the reference point (in the manners described above). The photograph is taken and the camera 712 is indexed and the reference mark 730 on the monocular 724 is realigned with the reference point. This process is repeated until the camera has been indexed a desired number of times about the reference point in the manner described above.

Thus, from the foregoing discussion, it is apparent that the present invention is well-suited for securing photographic images for immersion photography applications. The present invention can be successfully employed in connection with commercially available disposable cameras, digital cameras, video cameras, etc. without the need for a rigid supporting device such as a tripod. Furthermore, the present invention may find applications outside the realm of photography. The unique and novel advantages provided by the present invention could conceivably be advantageously employed in any application wherein it is desirable to index an object about an axis or reference point. The present invention is also easy to manufacture, install and use. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. Apparatus for orienting a lens of a camera having a central axis and a field of view in at least one predetermined direction relative to a reference point located outside of the field of view, said apparatus comprising:
    a beam projector; and
    a mounting device attaching said beam projector to the camera in a predetermined orientation wherein a visible beam produced by said beam projector is outside of the field of view and substantially perpendicular to the central axis of the lens such that when said visible beam is projected onto the reference point, the camera lens faces a predetermined direction.

2. The apparatus of claim 1 wherein said beam projector comprises a portable laser pointing device.

3. The apparatus of claim 1 wherein the reference point defines a plurality of reference orientations and wherein said beam projector projects a beam that can be sequentially oriented relative to the reference orientations such that the camera lens is sequentially oriented in a plurality of predetermined directions.

4. The apparatus of claim 1 wherein the beam projector projects at least two intersecting beams.

5. The apparatus of claim 1 wherein said mounting device comprises:
    a mounting plate affixable to the camera; and
    a beam projector supporter attached to said mounting plate.

6. The apparatus of claim 1 wherein said beam projector projects a beam in the shape of an arrow.

7. The apparatus of claim 5 wherein said beam projector supporter comprises a socket sized to receive said beam projector therein in said predetermined orientation.

8. The apparatus of claim 7 wherein said socket has a slot therein sized to receive a portion of said beam projector therein to orient said beam projector within said socket in said predetermined orientation.

9. The apparatus of claim 1 wherein said mounting device comprises an openable housing for receiving the camera therein in a predetermined orientation; and
    a beam projector supporter attached to said housing to support said beam projector relative to the lens of the camera when the camera is housed within said housing.

10. The apparatus of claim 9 wherein said beam projector supporter comprises a socket sized to receive said beam projector therein in a predetermined projector orientation.

11. The apparatus of claim 10 wherein said socket has a slot therein sized to receive a portion of said beam projector therein to orient said beam projector within said socket in said predetermined projector orientation.

12. The apparatus of claim 1 wherein the camera has a camera housing and wherein said mounting device is integrally formed with said camera housing.

13. The apparatus of claim 12 wherein said beam projector supporter comprises a socket sized to receive said beam projector therein in said predetermined orientation.

14. The apparatus of claim 13 wherein said socket has a slot therein sized to receive a portion of said beam projector therein to orient said beam projector within said socket in said predetermined orientation.

15. The apparatus of claim 1 further comprising a level attached to the camera.

16. The apparatus of claim 9 further comprising a level attached to said openable housing.

17. The apparatus of claim 12 further comprising a level attached to the camera housing.

18. Apparatus for orienting a lens of a camera having a central axis and a field of view relative to a reference point located outside of the field of view, said apparatus comprising a beam projector mountable to the camera in a predetermined position wherein a visible beam produced by said beam projector is substantially perpendicular to said central axis and outside of the field of view such that when said visible beam is projected onto the reference point, the camera lens faces a predetermined direction.

19. The apparatus of claim 18 wherein the reference point defines a plurality of reference orientations and wherein said beam projector projects a beam that can be sequentially oriented relative to the reference orientations such that the camera lens is sequentially oriented in a plurality of predetermined directions.

20. The apparatus of claim 19 further comprising a portable member supportable on a surface, said portable member having the reference point printed thereon.

21. The apparatus of claim 20 wherein said portable member comprises a mat having a top surface with said reference point printed thereon.

22. The apparatus of claim 20 wherein said portable member comprises a label having an adhesive thereon.

23. Apparatus for orienting the lens of a disposable camera in at least one predetermined direction relative to a reference point, said apparatus comprising:
    a housing sized to removably receive at least a portion of the disposable camera therein such that the lens is unobstructed by said housing, said housing constructed to permit access to the camera actuator; and
    a beam projector attached to said housing such that when said beam projector projects at least one beam onto the reference point, the camera lens is oriented in said at least one predetermined direction.

24. The apparatus of claim 23 wherein said housing substantially encloses the disposable camera therein and wherein said apparatus further comprises:
    a lens opening in said housing;
    an actuator access opening in said housing; and
    a closable door attached to said housing.

25. The apparatus of claim 24 further comprising an immobilizer affixed to said closable door such that when said closable door is closed, the camera is immobilized within said housing.

26. The apparatus of claim 23 wherein said beam projector projects at least two beam segments.

27. The apparatus of claim 23 wherein the reference point defines a plurality of reference orientations and wherein said beam projector projects a beam that can be sequentially oriented relative to the reference orientations such that the camera lens is sequentially oriented in a plurality of predetermined directions.

28. The apparatus of claim 27 wherein the reference point comprises a corner of a square member and wherein said beam comprises intersecting lines superimposable over said corner.

29. The apparatus of claim 28 wherein said square member comprises a floor tile.

30. The apparatus of claim 23 wherein said reference point is located on a portable member.

31. Apparatus for orienting a lens of a disposable camera in at least one predetermined direction relative to a reference point, said apparatus comprising:
a housing sized to removably receive the disposable camera therein, said housing having an actuator opening and a lens opening therein and a closable door attached thereto;
a camera immobilizer attached to said housing for immobilizing the camera within said housing when the camera is housed therein; and
a beam projector attached to said housing for projecting a beam in a predetermined shape such that when said beam is oriented relative to the reference point, the camera lens is oriented in a predetermined direction.

32. Apparatus for orienting a lens of a camera in at least one predetermined direction relative to a reference point, said apparatus comprising:
a mounting plate affixable to the camera; and
a socket sized to receive a beam projector therein, said socket having a slot therein sized to receive a portion of the beam projector therein to orient the beam projector within said socket in a predetermined orientation such that when the beam projector projects a beam onto the reference point, the camera lens is oriented in a predetermined direction.

33. The apparatus of claim 32 wherein the camera has a threaded socket therein and wherein said mounting plate is affixable to the camera by a screw sized to be received in the threaded socket.

34. A camera, comprising:
a camera housing;
a shutter and lens assembly;
a film handling assembly;
a beam projector; and
a socket integrally formed with said camera housing and sized to receive at least a portion of said beam projector therein, said socket having a slot therein sized to receive an orientation portion of the beam projector therein to orient the beam projector within said socket in a predetermined orientation such that when the beam projector projects a beam onto a reference point, the camera lens is oriented in a predetermined direction.

35. The camera of claim 34 wherein the reference point defines a plurality of reference orientations and wherein said beam projector projects a beam that can be sequentially oriented relative to the reference orientations such that the camera lens is sequentially oriented in a plurality of predetermined directions.

36. Apparatus for orienting a lens of a camera having a central axis and a field of view in at least one predetermined direction relative to a reference point, sail apparatus comprising:
means for projecting a beam; and
means for attaching said means for projecting to the camera in a predetermined orientation wherein a visible beam produced by said beam projector is substantially perpendicular to the central axis and outside of the field of view such that when said means for projecting projects said visible beam onto the reference point, the camera lens faces a predetermined direction.

37. The apparatus of claim 36 further comprising means for establishing the reference point on a surface.

38. The apparatus of claim 37 wherein said means for establishing defines a plurality of reference orientations and wherein said means for projecting projects a beam that can be sequentially oriented relative to the reference orientations such that the camera lens is sequentially oriented in a plurality of predetermined directions.

39. Apparatus for orienting a forward-facing lens of a camera having a relative forward-facing field of view relative to a reference point outside of the forward-facing field of view in a predetermined direction, said apparatus comprising a sighting device attached to the camera in a downward-facing orientation for viewing the reference point outside of the forward-facing field of view and having orienting indicia thereon such that when said orienting indicia is oriented relative to the reference point in a predetermined orientation, the camera lens is oriented in a predetermined direction.

40. The apparatus of claim 39 wherein the reference point defines a plurality of reference orientations such that said orienting indicia is sequentially alignable with said reference orientations to sequentially orient the camera lens in a plurality of predetermined directions.

41. The apparatus of claim 39 wherein said sighting device comprises a monocle have viewable indicia printed thereon and attached to the camera.

42. The apparatus of claim 39 wherein said monocle has a predetermined amount of magnification.

43. The apparatus of claim 39 wherein the camera has a housing and wherein said monocle is supported within a support member integrally formed with the camera housing.

44. The apparatus of claim 39 wherein the camera has a housing and wherein said sighting device comprises a viewable reference mark on the housing that can be selectively aligned with the reference point.

45. A method for selectively orienting a forward-facing lens of a camera having a forward-facing field of view in at least one predetermined direction, said method comprising:
providing a beam generator on the camera for generating a non-forwardly extending beam having a predetermined shape;
establishing a reference point outside of the forward-facing field of view such that when the beam generated by the beam generator is aligned with the reference point in a predetermined orientation, the camera lens is oriented in a predetermined direction; and
aligning the beam in the predetermined orientation relative to the reference point.

46. The method of claim 45 further comprising leveling the camera.

47. The method of claim 46 wherein said leveling comprises:
   providing a level device on the camera;
   viewing the level device; and
   tilting the camera until the level device indicates that the camera is level.

48. The method of claim 45 wherein said establishing comprises providing a mat having the reference point printed thereon in a predetermined location.

49. The method of claim 45 wherein said establishing comprises adhering a label having the reference point thereon to an object in a predetermined location.

50. The method of claim 45 wherein said establishing comprises selecting a corner of a floor tile installed in a predetermined location.

51. A method for orienting a forward-facing lens of a camera having a forward-facing field of view in at least one predetermined direction, said method comprising:
   providing a sighting device on the camera in a downward facing orientation for viewing a reference point located below the camera, said sighting device having orienting indicia thereon;
   establishing the reference point below the camera such that when the orienting indicia is aligned with the reference point in a predetermined orientation, the camera lens is oriented in a predetermined direction; and
   aligning the orienting indicia in the predetermined orientation relative to the reference point.

52. The method of claim 51 further comprising leveling the camera.

53. A method for sequentially orienting a lens of a camera having a field of view in a plurality of predetermined directions, said method comprising:
   providing a beam generator on the camera for generating a beam having a predetermined shape;
   establishing a reference point outside of the field of view that defines a plurality of reference orientations, each reference orientation corresponding with a predetermined direction, such that when the beam generated by the beam generator is aligned with the reference point in a reference orientation, the camera lens is oriented in the predetermined direction corresponding with the reference orientation;
   aligning the beam with the reference point in one of the reference orientations such that the camera lens faces a direction corresponding to that reference orientation; and
   realigning the beam with the reference point in another reference orientation such that the camera lens faces another direction corresponding to the another reference orientation.

54. The method of claim 53 further comprising leveling the camera.

55. The method of claim 54 wherein said leveling comprises:
   providing a level device on the camera;
   viewing the level device; and
   tilting the camera until the level device indicates that the camera is level.

56. The method of claim 54 wherein said leveling comprises:
   providing a tensionable neck strap on the camera;
   placing the neck strap around a user's neck;
   establishing tension in the neck strap; and
   maintaining said tension in the neck strap during said aligning and realigning.

57. The method of claim 54 wherein said leveling comprises:
   providing a tensionable neck strap on the camera;
   providing a viewable level device on the camera for leveling the camera in the first plane;
   placing the neck strap around a user's neck;
   establishing tension in the neck strap to level the camera in the second plane;
   viewing the viewable level device; and
   tilting the camera in the first plane until the level device indicates that the camera is level in the first plane while maintaining the tension in the neck strap.

58. The method of claim 57 further comprising:
   maintaining the tension in the neck strap during and after said realigning;
   reviewing the viewable level after said realigning; and
   retilting the camera in the first plane until the level device indicates that the camera is level in the first plane.

59. The method of claim 54 wherein said leveling comprises:
   providing a first level device on the camera for indicating whether the camera is level in the first plane;
   providing a second level device on the camera for indicating whether the camera is level in a second plane;
   viewing the first level device;
   tilting the camera in the first plane until the first level device indicates that the camera is level in the first plane;
   viewing the second level device; and
   tilting the camera in the second plane until the second level device indicates that the camera is level in the second plane.

60. A method for sequentially orienting a lens of a camera in a plurality of predetermined directions, said method comprising:
   providing a sighting device on the camera, said sighting device having orienting indicia;
   establishing a reference point that has a plurality of reference orientations, each reference orientation corresponding with a predetermined direction such that when the orienting indicia of the sighting device is aligned with the reference point in a reference orientation, the camera lens is oriented in the predetermined direction corresponding to that reference orientation; and
   aligning the reference indicia with the reference point in one of the reference orientations such that the camera lens faces a direction corresponding to that reference orientation; and
   realigning the beam with the reference point in another reference orientation such that the camera lens faces another direction corresponding to the another reference orientation.

61. A method for orienting a forward-facing lens of a camera having a camera housing in at least one predetermined direction, said method comprising:
   providing a visible reference mark on a top surface of the camera housing;
   establishing a reference point such that when the reference mark is aligned above the reference point in a predetermined orientation, the camera lens is oriented in a predetermined direction; and supporting the camera above the reference point such that the reference mark is aligned with the reference point in the predetermined orientation.

62. A method for sequentially orienting a lens of a camera in a plurality of predetermined directions, said method comprising:

providing a reference mark on the camera;

establishing a reference point that defines a plurality of reference orientations, each reference orientation corresponding with a predetermined direction, such that when the reference mark on the camera is aligned with the reference point in a reference orientation, the camera lens is oriented in the predetermined direction corresponding with the reference orientation;

aligning the reference mark with the reference point in one of the reference orientations such that the camera lens faces a direction corresponding to that reference orientation; and realigning the mark with the reference point in another reference orientation such that the camera lens faces another direction corresponding to the another reference orientation.

63. A method for sequentially orienting an object in a plurality of predetermined directions about an axis, said method comprising:

providing a beam generator on the object for generating a beam having a predetermined shape;

establishing a reference point through which the axis extends, said reference point further defining a plurality of reference orientations, each reference orientation corresponding with a predetermined direction, such that when the beam generated by the beam generator is aligned with the reference point in a reference orientation, the object is oriented in the predetermined direction corresponding with the reference orientation;

aligning the beam with the reference point in one of the reference orientations such that a portion of the object faces a direction corresponding to that reference orientation;

indexing the object about the axis; and realigning the beam with the reference point in another reference orientation such that the portion of the object faces another direction corresponding to the another reference orientation.

64. Apparatus for orienting a lens of a camera having a field of view in at least one predetermined direction relative to a reference point located outside of the field of view, said apparatus comprising:

a beam projector; and a mounting device attaching said beam projector to the camera in a predetermined orientation wherein an arrow-shaped visible beam produced by said beam projector is outside of the field of view such that when said visible beam is projected onto the reference point, the camera lens faces a predetermined direction.

65. Apparatus for orienting a lens of a camera having a field of view in at least one predetermined direction relative to a reference point located outside of the field of view, said apparatus comprising:

a beam projector;

a mounting plate affixable to the camera; and a socket attached to the mounting plate and sized to receive the beam projector therein in a predetermined orientation wherein a visible beam produced by said beam projector is outside of the field of view such that when said visible beam is projected onto the reference point, the camera lens faces a predetermined direction.

66. The apparatus of claim 65 wherein said socket has a slot therein sized to receive a portion of said beam projector therein to orient said beam projector within said socket in said predetermined orientation.

67. Apparatus for orienting a lens of a camera having a field of view in at least one predetermined direction relative to a reference point located outside of the field of view, said apparatus comprising:

a beam projector;

an openable housing for receiving the camera therein in a predetermined orientation; and a beam projector supporter attached to said openable housing to support said beam projector therein relative to the lens of the camera when the camera is housed within said housing and wherein a visible beam produced by said beam projector is outside of the field of view such that when said visible beam is projected onto the reference point, the camera lens faces a predetermined direction.

68. The apparatus of claim 67 wherein said beam projector support comprises a socket sized to receive the beam projector therein in a predetermined orientation.

69. The apparatus of claim 68 wherein said socket has a slot therein sized to receive a portion of said beam projector therein to orient said beam projector within said socket in said predetermined orientation.

70. Apparatus for orienting a lens of a camera having a field of view in at least one predetermined direction relative to a reference point located outside of the field of view, said apparatus comprising:

a beam projector;

a mounting device attaching said beam projector to the camera in a predetermined orientation wherein a visible beam produced by said beam projector is outside of the field of view such that when said visible beam is projected onto the reference point, the camera lens faces a predetermined direction; and a level attached to the camera.

* * * * *